(12) United States Patent
Doi

(10) Patent No.: US 7,071,874 B2
(45) Date of Patent: Jul. 4, 2006

(54) RADIO TERMINAL DEVICE, TRANSMISSION DIRECTIVITY CONTROL METHOD, AND TRANSMISSION DIRECTIVITY CONTROL PROGRAM

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/508,211

(22) PCT Filed: Mar. 11, 2003

(86) PCT No.: PCT/JP03/02882

§ 371 (c)(1), (2), (4) Date: Sep. 20, 2004

(87) PCT Pub. No.: WO03/079598

PCT Pub. Date: Sep. 25, 2003

(65) Prior Publication Data

US 2005/0239507 A1 Oct. 27, 2005

(30) Foreign Application Priority Data

Mar. 20, 2002 (JP) ............................. 2002-078483

(51) Int. Cl.
*H01Q 3/00* (2006.01)
(52) U.S. Cl. ...................................... 342/377; 342/374
(58) Field of Classification Search ................ 342/368, 342/373, 374, 377, 378; 455/277.1
See application file for complete search history.

(56) References Cited

U.S. PATENT DOCUMENTS

| 6,665,286 B1 * | 12/2003 | Maruta et al. ............... 370/342 |
| 6,754,467 B1 * | 6/2004 | Ide et al. ....................... 455/25 |
| 6,845,244 B1 * | 1/2005 | Ide et al. ..................... 455/506 |
| 2002/0032015 A1 | 3/2002 | Kitakado et al. |
| 2002/0077153 A1 | 6/2002 | Chiba et al. |
| 2003/0069047 A1 * | 4/2003 | Kitahara ..................... 455/562 |
| 2004/0058711 A1 * | 3/2004 | Hirayama et al. ........ 455/562.1 |

FOREIGN PATENT DOCUMENTS

| EP | 0 936 755 A2 | 8/1999 |
| JP | 05-284077 | 10/1993 |
| JP | 10-093337 | 4/1998 |
| JP | 10-117162 | 5/1998 |
| JP | 10-200322 | 7/1998 |
| JP | 11-298388 | 10/1999 |
| JP | 11-331936 | 11/1999 |
| JP | 2000-174536 | 6/2000 |

(Continued)

OTHER PUBLICATIONS

Kikuma, Nobuyoshi, "Adaptive Signal Processing by Array Antenna." Kagaku Gijutsu Shuppan, Nov. 1998, pp. 35-49.

(Continued)

*Primary Examiner*—Dao Phan
(74) *Attorney, Agent, or Firm*—McDermott Will & Emery LLP

(57) ABSTRACT

An adaptive array terminal (2000) includes a reception adaptive array unit (2030) extracting a reception signal from a base station by multiplying signals from respective antennas (#AN 1–#AN 2) of an array antenna by respective reception weights, a transmission adaptive array unit (2090) applying to respective antennas of the array antenna a plurality of signals generated by multiplying by a transmission signal by transmission weights to form transmission directivity, and a transmission weight calculator (2070) calculating transmission weights added with a specified constraint in accordance with designation in a reception signal.

30 Claims, 22 Drawing Sheets

FOREIGN PATENT DOCUMENTS

| | | |
|---|---|---|
| JP | 2000-174536 A | 6/2000 |
| JP | 2000-174678 A | 6/2000 |
| JP | 2000-188568 A | 7/2000 |
| JP | 2000-197112 | 7/2000 |
| JP | 2000-216724 | 8/2000 |
| JP | 2001-244912 A | 9/2001 |
| JP | 2002-050989 | 2/2002 |
| JP | 2002-050989 A | 2/2002 |
| JP | 2002-050991 A | 2/2002 |
| WO | WO 00/72464 A1 | 11/2000 |

OTHER PUBLICATIONS

Ohgane, Takeo., et al. "A Study on a Channel Allocation Scheme with an Adaptive Array in SDMA." IEEE, Conference Proceedings VTC'97, vol. 2, May 1997, pp. 6 (Including Cover Sheet).

Tanaka, Daisuke, "A Criterion of Channel Allocation for 3-user SDMA with an Adaptive Array." Technical Reprot of IEICE, RCS98-117, Oct. 1998, pp. 103-108.

* cited by examiner

US 7,071,874 B2

RADIO TERMINAL DEVICE, TRANSMISSION DIRECTIVITY CONTROL METHOD, AND TRANSMISSION DIRECTIVITY CONTROL PROGRAM

TECHNICAL FIELD

The present invention relates to the configuration of a radio terminal apparatus employed in radio communication of a mobile phone and the like, a transmission directivity control method of such a radio terminal apparatus, and a transmission directivity control program.

BACKGROUND ART

In the field of mobile communication system (for example, personal handyphone system: hereinafter PHS) evolving rapidly this few years, a PDMA (Path Division Multiple Access) system that allows mobile terminal apparatuses of a plurality of users to effect path multiple connection to a radio base system by dividing the same time slot of the same frequency spatially has been proposed in order to improve the usage efficiency of radio frequency. In the PDMA system, the signals from the mobile terminal apparatuses of respective users are separated and extracted by the well-known adaptive array processing. The PDMA system is also called the SDMA system (Spatial Division Multiple Access).

FIG. 18 represents the channel arrangement of the various communication systems of frequency division multiple access (FDMA), time division multiple access (TDMA), and spatial division multiple access (SDMA).

First, FDMA, TDMA and SDMA will be described briefly with reference to FIG. 18. FIG. 18(a) corresponds to FDMA. The analog signals of users 1–4 are subjected to frequency-division and transmitted over radio waves of different frequencies f1–f4. The signals of respective users 1–4 are separated by frequency filters.

FIG. 18(b) corresponds to TDMA. Digitized signals of respective users are transmitted over radio waves at different frequencies f1–f4, and time-divided on the basis of the prescribed period of time (time slot). The signals of respective users are separated by means of frequency filters and time-synchronization between a base station and mobile terminal devices of respective users.

The SDMA system has now been proposed to improve the usage efficiency of radio frequency in accordance with the spread of mobile phones. The SDMA system spatially divides one time slot of the same frequency to transmit data of a plurality of users, as shown in FIG. 18(c). In this SDMA, the signals of respective users are separated by means of frequency filters, time synchronization between a base station and mobile terminal devices of respective users, and a mutual interference canceller such as an adaptive array.

The adaptive array processing set forth above is well known in the field of art, and is described in detail in, for example, "Adaptive Signal Processing by Array Antenna" (Kagaku Gijutsu Shuppan), issued Nov. 25, 1998, pp. 35–49, "Chapter 3: MMSE Adaptive Array" by Nobuyoshi Kikuma. The conventional adaptive array processing will be described briefly hereinafter.

FIG. 19 is a schematic block diagram of a configuration of a transmission and reception system 5000 of a conventional base station for SDMA.

In the configuration shown in FIG. 19, four antennas #1–#4 are provided to establish identification between users PS1 and PS2. In a reception operation, the outputs of antennas are provided to an RF circuit 5101 to be amplified by the reception amplifier, and then frequency-converted by a local oscillation signal. The converted signals have the unnecessary frequency signal removed by filters, then subjected to A/D conversion, and applied to a digital signal processor 5102 as digital signals.

Digital signal processor 5102 includes a channel allocation reference calculator 5103, a channel allocating apparatus 5104, and an adaptive array 5100. Channel allocation reference calculator 5103 calculates in advance whether the signals from the two users can be separated by the adaptive array. Based on the calculation result, channel allocation apparatus 5104 provides channel allocation information including user information, selecting frequency and time, to adaptive array 5100. Adaptive array 5100 applies a weighting operation in real time on the signals from the four antennas #1–#4 based on the channel allocation information to separate only the signals of a particular user.

[Configuration of Adaptive Array Antenna]

FIG. 20 is a block diagram showing a configuration of a transmission and reception unit 5100a corresponding to one user in adaptive array 5100. The example of FIG. 20 has n input ports 5020-1 to 5020-n to extract the signal of the desired user from input signals of a plurality of users.

The signals input to respective input ports 5020-1 to 5020-n are applied via switch circuits 5010-1 to 5010-n to a weight vector control unit 5011 and multipliers 5012-1 to 5012-n.

Weight vector control unit 5011 calculates weight vectors $w_{1i}$–$w_{ni}$ using input signals, a unique word signal corresponding to signals of a particular user prestored in a memory 5014, and the output from an adder 5013. In the present specification, subscript "i" implies that the weight vector is employed for transmission/reception with the i-th user.

Multipliers 5012-1 to 5012-n multiply the input signals from input ports 5020-1 to 5020-n by weight vectors $w_{1i}$–$w_{ni}$, respectively. The multiplied results are applied to adder 5013. Adder 5013 adds the output signals from multipliers 5012-1 to 5012-n to output the added signals as a reception signal $S_{RX}(t)$. This reception signal $S_{RX}(t)$ is also provided to weight vector control unit 5011.

Transmission and reception unit 5100a further includes multipliers 5015-1 to 5015-n receiving and multiplying an output signal $S_{TX}(t)$ from an adaptive array radio base station by respective weight vectors $w_{1i}$–$w_{ni}$ applied from weight vector control unit 5011. The outputs of multipliers 5015-1 to 5015-n are provided to switch circuits 5010-1 to 5010-n, respectively. Specifically, switch circuits 5010-1 to 5010-n provide the signals applied from input ports 5020-1 to 5020-n to a signal receiver unit 1R in a signal receiving mode, and provide the signal from a signal transmitter unit 1T to input/output ports 5020-1 to 5020-n.

[Operating Mechanism of Adaptive Array]

The operating mechanism of transmission and reception unit 5100a of FIG. 20 will be described briefly here.

For the sake of simplifying the description, it is assumed that there are four antenna elements, and that two users PS effect communication at the same time. Here, the signals applied to reception unit 1R from respective antennas are represented by the equations set forth below.

$$RX_1(t)=h_{11}Srx_1(t)+h_{12}Srx_2(t)+n_1(t) \qquad (1)$$

$$RX_2(t)=h_{21}Srx_1(t)+h_{22}Srx_2(t)+n_2(t) \qquad (2)$$

$$RX_3(t)=h_{31}Srx_1(t)+h_{32}Srx_2(t)+n_3(t) \qquad (3)$$

$$RX_4(t)=h_{41}Srx_1(t)+h_{42}Srx_2(t)+n_4(t) \qquad (4)$$

Signal $RX_j$ (t) represents a reception signal of the j-th (j=1, 2, 3, 4) antenna. Signal $Srx_i$ (t) represents a signal transmitted by the i-th (i=1, 2) user. Coefficient $h_{ji}$ represents the complex coefficient of a signal from the i-th user received at the j-th antenna, and $n_j$ (t) represents noise included in the j-th reception signal.

The above equations (1)–(4) may be represented in vector form as follows:

$$X(t)=H_1 Srx_1(t)+H_2 Srx_2(t)+N(t) \tag{5}$$

$$X(t)=[RX_1(t), RX_2(t), \ldots, RX_n(t)]^T \tag{6}$$

$$H_i=[h_{1i}, h_{2i}, \ldots, h_{ni}]^T, (i=1, 2) \tag{7}$$

$$N(t)=[n_1(t), n_2(t), \ldots, n_n(t)]^T \tag{8}$$

In equations (6)–(8), $[\ldots]^T$ denotes the transposition of $[\ldots]$. Here, X (t) represents the input signal vector, $H_i$ the reception signal coefficient vector of the i-th user, and N (t) a noise vector.

The adaptive array antenna outputs as a reception signal $S_{RX}(t)$ a synthesized signal obtained by multiplying the input signals from respective antennas by respective weight coefficients $w_{1i}$–$w_{ni}$, as shown in FIG. 20. Here, The number of antennas n is 4.

Given these preliminaries, the operation of an adaptive array in the case of extracting a signal $Srx_1$ (t) transmitted by the first user, for example, is set forth below.

Output signal y1 (t) of adaptive array 2100 can be represented by the following equations by multiplying input signal vector X(t) by weight vector $W_1$.

$$y1(t)=X(t) W_1^T \tag{9}$$

$$W_1 = [w11, w21, w31, w41]^T \tag{10}$$

In other words, weight vector $W_1$ is a vector with the weight coefficients $w_{j1}$(=1, 2, 3, 4) to be multiplied by the j-th input signal RXj (t) as elements.

Substituting input signal vector X (t) represented by equation (5) into y1 (t) represented by equation (9) yields:

$$y1(t)=H_1 W_1^T Srx_1(t)+H_2 W_1^T Srx_2(t)+N(t)W_1^T \tag{11}$$

By a well known method, weight vector $w_1$ is sequentially controlled by weight vector control unit 5011 so as to satisfy the following simultaneous equations when adaptive array 5100 operates in an ideal situation.

$$H_1 W_1^T=1 \tag{12}$$

$$H_2 W_1^T=0 \tag{13}$$

If weight vector $W_1$ is perfectly controlled so as to satisfy equations (12) and (13), output signal y1 (t) from adaptive array 2100 is eventually represented by the following equations.

$$y1(t)=Srx_1(t)+N_1(t) \tag{14}$$

$$N_1(t)=n_1(t)w_{11}+n_2(t)w_{21}+n_3(t)w_{31}+n_4(t)w_{41} \tag{15}$$

Specifically, signal $Srx_1$ (t) transmitted from the first of the two users will be obtained for output signal y1 (t).

In FIG. 20, input signal $S_{TX}$ (t) for adaptive array 5100 is applied to transmitter unit 1T in adaptive array 2100 to be applied to respective one inputs of multipliers 5015-1, 5015-2, 5015-3, . . . , 5015-n. To the other inputs of these multipliers, weight vectors $w_{1i}$, $w_{2i}$, $w_{3i}$, . . . , $w_{ni}$ calculated by weight vector control unit 5011 based on reception signals described above are copied and applied.

The input signals weighted by these multipliers are delivered to corresponding antennas #1, #2, #3, . . . , #n via corresponding switches 5010-1, 5010-2, 5010-3, 5010-n for transmission.

FIG. 21 is a schematic diagram to describe a configuration of signals transferred between a terminal and SDMA base station 5000.

The signals of 1 frame are divided into 8 slots, the 4 slots of the former half directed to, for example, reception, and the 4 slots of the latter half directed to, for example, transmission.

Each slot is formed of 120 symbols. Based on one slot for reception and one slot for transmission as one set, the signals of 1 frame can be allocated to as many as 4 users in the example of FIG. 21.

Identification of users PS1 and PS2 is established as set forth below. A radio wave signal of a mobile phone is transmitted taking a frame form set forth above. The slot signal from a mobile phone is mainly composed of a preamble formed of a signal series known to a radio base station, and data (voice and the like) formed of a signal series unknown to the radio base station.

The preamble signal series includes a signal stream of information to identify whether the current user is the appropriate user to converse for the radio base station. Weight vector control unit 5011 of adaptive array radio base station 1 compares the unique word signal output from memory 5014 with the received signal series to conduct weight vector control (determination of weight coefficient) so as to extract the signal expected to include the signal series corresponding to user PS1.

It is assumed that each frame includes the above-described unique word signal (reference signal) zone, and takes a configuration that allows error detection by a cyclic code (CRC: cyclic redundancy check).

In addition to the case where adaptive array processing is carried out at the base station to establish transmission or reception directivity, there are cases where adaptive array processing is carried out at the reception terminal side. A terminal that carries out adaptive array processing in such terminals (mobile station) is referred to as an "adaptive array terminal".

Such an adaptive array terminal always carries out an adaptive array operation in both the reception mode and transmission mode. Therefore, the response vector of a signal from the terminal, when connected to the above-described SDMA base station, will vary for each frame, posing the problem that the communication quality may be degraded in multiple access.

This problem will be described in further detail hereinafter.

FIG. 22 schematically shows a state where radio communication is conducted between an adaptive array base station CS1 and respective terminals of an adaptive array terminal PS1 and a terminal PS2 that carries out the general non-directional transmission and reception.

Referring to FIG. 22, a plurality of the same signals arrive at SDMA base station CS1 by multipath propagation from adaptive array terminal PS1. The reception signal response vector of a signal from adaptive array terminal PS1 is represented as in the equations set forth below as a composite vector of a plurality of signals.

$$X(t)=H_{11}W_1 S_1(t)+\ldots+H_{1m}W_2 S_1(t)+H_2 S_2(t) \tag{16}$$

$$X(t)=H_1 S_1(t)+H_2 S_2(t) \tag{17}$$

$$H_1=H_{11}W_1+\ldots+H_{1m}W_2 \tag{18}$$

At SDMA base station CS1, the reception signal response vector (composite vector) for the signal from adaptive array terminal PS1 depends on the weights ($W_1$, $W_2$) of the transmission adaptive array processing of adaptive array terminal PS1.

This means that, when the weights of the transmission weight change at the adaptive array terminal PS1, the reception signal response vector will be altered at SDMA base station CS1 even if there is absolutely no variation in the propagation path itself.

In other words, the transmission weights may suddenly be shifted independent of variation in propagation due to terminal noise, calculation error, and the like.

When spatial multiplexing is to be carried out, SDMA base station CS1 measures the reception response vector for each of the multiple terminals. Multiple access communication (SDMA system communication) is allowed when the spatial correlation between the reception response vectors of the multiple terminals is equal to or below a threshold value.

Therefore, when adaptive array transmission is effected on the part of terminal PS1, there may be a case where the reception signal response vector viewed from the SDMA base station CS1 side varies suddenly and unpredictably, imposing the problem that the multiplex communication will be degraded in quality.

FIG. 23 shows a reception signal response vector $H_1$ as a composite vector with respect to signals propagated via a plurality of paths from adaptive array terminal PS1.

Since such a reception signal response vector is altered depending on variation in the propagation path as described above as well as by other various factors, the reception signal response vector $H_1$ applied as a composite vector may be altered more greatly than the variation in the propagation path.

The present invention is directed to solve the above-described problems. An object is to provide a radio terminal apparatus that conducts adaptive array processing, allowing radio communication with an SDMA base station while maintaining favorable communication quality, a transmission directivity control method and a transmission directivity control program thereof.

DISCLOSURE OF THE INVENTION

In summary, the present invention includes an array antenna having a plurality of antennas, a reception signal processing unit extracting a reception signal from a base station by multiplying signals from respective antennas of the array antenna by respective reception weights, a transmission signal processing unit applying to respective antennas of the array antenna a plurality of signals generated by multiplying a transmission signal by transmission weights to form transmission directivity, and transmission weight generation means for adaptively switching between a mode of calculating transmission weights forming transmission directivity towards the base station and a mode of calculating transmission weights added with a specified constraint, in accordance with designation in the reception signals to generate transmission weights.

Preferably, when the reception signal processing unit multiplies a signal from the base station by reception weights having reception directivity, the transmission weight generation means provides the reception weights to the transmission signal processing unit as the transmission weights, in accordance with designation from the base station.

Preferably, when the reception signal processing unit multiplies a signal from the base station by reception weights having reception directivity, the transmission weight generation means generates the transmission weights based on a transmission response vector estimated from a reception response vector, in accordance with designation from the base station.

Preferably, when the reception signal processing unit multiplies a signal from the base station by reception weights having reception directivity, the transmission weight generation means sets the transmission weight with a fixed amplitude and phase, in accordance with designation from the base station.

Preferably, when the reception signal processing unit multiplies a signal from the base station by reception weights having reception directivity, the transmission weight generation means carries out a process of setting a fixed value of amplitude of the transmission weight, and gradually shifting a phase of the transmission weight according to a predetermined sequence, in accordance with designation from the base station.

Further preferably, a signal transferred between the base station and a radio terminal apparatus is divided into a plurality of frames, and the transmission weight generation means calculates the phase of the transmission by a weighted mean of the reception weights in past and current frames.

Preferably, a signal transferred between the base station and a radio terminal apparatus is divided into a plurality of frames. When the reception signal processing unit multiplies a signal from the base station by reception weights having reception directivity, the transmission weight generation means calculates the transmission weight based on a weighted mean of reception response vectors in past and current frames, in accordance with designation from the base station.

Preferably, the radio terminal apparatus further includes reception level detection means for detecting a reception level of each of the antennas. The transmission weight generation means generates the transmission weights so as to select an antenna of the highest reception level.

Preferably, a signal transferred between the base station and a radio terminal apparatus is divided into a plurality of frames. When the reception signal processing unit multiplies a signal from the base station by reception weights having reception directivity, the transmission weight generation means newly takes a weighted mean of transmission weights calculated in the past and current frames as a transmission weight of the current frame, in accordance with designation from the base station.

Preferably, the radio terminal apparatus further includes storage means for storing in advance a set of transmission weights that increases orthogonality of reception response vectors at the base station. The transmission weight generation means selects and provides to the transmission signal processing unit the transmission weight stored in the storage means, in accordance with designation from the base station.

According to another aspect of the present invention, a transmission directivity control method of a radio terminal apparatus including an array antenna having a plurality of antennas and for separating and extracting a reception signal from a base station by multiplying signals from respective antennas of the array antenna by respective reception weights, includes the steps of: adaptively switching between a mode of calculating transmission weights forming transmission directivity towards the base station and a mode of calculating the transmission weights added with a specified constraint, in accordance with designation in a reception signal, to generate the transmission weights and providing to respective antennas of the array antenna a plurality of signals generated by multiplying a transmission signal by the transmission weights to form the transmission directivity.

Preferably, the step of generating transmission weights includes the step of taking the reception weights as the transmission weights when a signal from the base station is multiplied by reception weights having reception directivity, in accordance with designation from the base station.

Preferably, the step of generating transmission weights includes the step of generating the transmission weights based on a transmission response vector estimated from a reception response vector a signal from the base station is multiplied by reception weights having reception directivity, in accordance with designation from the base station.

Further preferably, the step of generating transmission weights includes the step of setting the transmission weight with a fixed amplitude and phase when a signal from the base station is multiplied by reception weights having reception directivity, in accordance with designation from the base station.

Preferably, the step of generating transmission weights includes the step of carrying out a process of setting a fixed value of amplitude of the transmission weight, and gradually shifting a phase of the transmission weight according to a predetermined sequence when the reception signal processing unit multiplies a signal from the base station by reception weights having reception directivity, in accordance with designation from the base station.

Preferably, a signal transferred between the base station and a radio terminal apparatus is divided into a plurality of frames. The step of generating transmission weights includes the step of calculating a phase of the transmission weight based on a weighted mean of reception weights in past and current frames.

Preferably, a signal transferred between the base station and a radio terminal apparatus is divided into a plurality of frames. The step of generating transmission weights includes the step of calculating the transmission weight based on a weighted mean of reception response vectors in past and current frames when a signal from the base station is multiplied by reception weights having reception directivity, in accordance with designation from the base station.

Preferably, the method further includes the step of detecting a reception level of each of the antennas. The step of generating transmission weights includes the step of generating the transmission weights so as to select an antenna of highest reception level.

Preferably, a signal transferred between the base station and a radio terminal apparatus is divided into a plurality of frames. The step of generating transmission weights includes the step of newly taking a weighted mean of transmission weights calculated in the past and current frames as a transmission weight of the current frame when a signal from the base station is multiplied by reception weights having reception directivity in accordance with designation from the base station.

Preferably, the method further includes the step of storing in advance a set of transmission weights that increases the orthogonality of a reception response vector at the base station. The step of generating transmission weights includes the step of selecting the transmission weight stored in advance in accordance with designation from the base station.

According to a further aspect of the present invention, a transmission directivity control program of a radio terminal apparatus including an array antenna having a plurality of antennas and for separating and extracting a reception signal from a base station by multiplying signals from respective antennas of the array antenna by respective reception weights, causes a computer to execute the steps of: adaptively switching between a mode of calculating transmission weights forming transmission directivity towards the base station and a mode of calculating the transmission weights added with a specified constraint, in accordance with designation in the reception signal to generate transmission weights and providing to respective antennas of the adaptive array a plurality of signals generated by multiplying a transmission signal by transmission weights to form the transmission directivity.

Preferably, the step of generating transmission weights includes the step of taking the reception weights as the transmission weights when a signal from the base station is multiplied by reception weights having reception directivity, in accordance with designation from the base station.

Preferably, the step of generating transmission weights includes the step of generating the transmission weights based on a transmission response vector estimated from a reception response vector when a signal from the base station is multiplied by reception weights having reception directivity, in accordance with designation from the base station.

Preferably, the step of generating transmission weights includes the step of setting the transmission weight with a fixed amplitude and phase when a signal from the base station is multiplied by reception weights having reception directivity, in accordance with designation from the base station.

Preferably, the step of generating transmission weights includes the step of carrying out a process of setting a fixed value of amplitude of the transmission weight, and gradually shifting a phase of the transmission weight according to a predetermined sequence when a signal from the base station is multiplied by reception weights having reception directivity, in accordance with designation from the base station.

Preferably, a signal transferred between the base station and a radio terminal apparatus is divided into a plurality of frames. The step of generating transmission weights includes the step of calculating a phase of a transmission weight based on a weighted mean of reception weights in past and current frames.

Preferably, a signal transferred between the base station and a radio terminal apparatus is divided into a plurality of frames. The step of generating transmission weights includes the step of calculating the transmission weights based on a weighted mean of reception response vectors in past and current frames when a signal from the base station is multiplied by reception weights having reception directivity in accordance with designation from the base station.

Preferably, the method further includes the step of detecting a reception level of each of the antenna. The step of generating transmission weights includes the step of generating transmission weights so as to select an antenna of highest reception level.

Preferably, a signal transferred between the base station and a radio terminal apparatus is divided into a plurality of frames. The step of generating transmission weights includes the step of newly taking a weighted mean of transmission weights calculated in the past and current frames as the transmission weight of the current frame when a signal from the base station is multiplied by reception weights having reception directivity, in accordance with designation from the base station.

Preferably, the program further includes the step of storing in advance a set of transmission weights that increases the orthogonality of a reception response vector at the base station. The step of generating transmission weights includes the step of selecting the transmission weight stored in advance in accordance with designation from the base station.

BEST MODE TO CARRY OUT THE INVENTION

Figure 1:
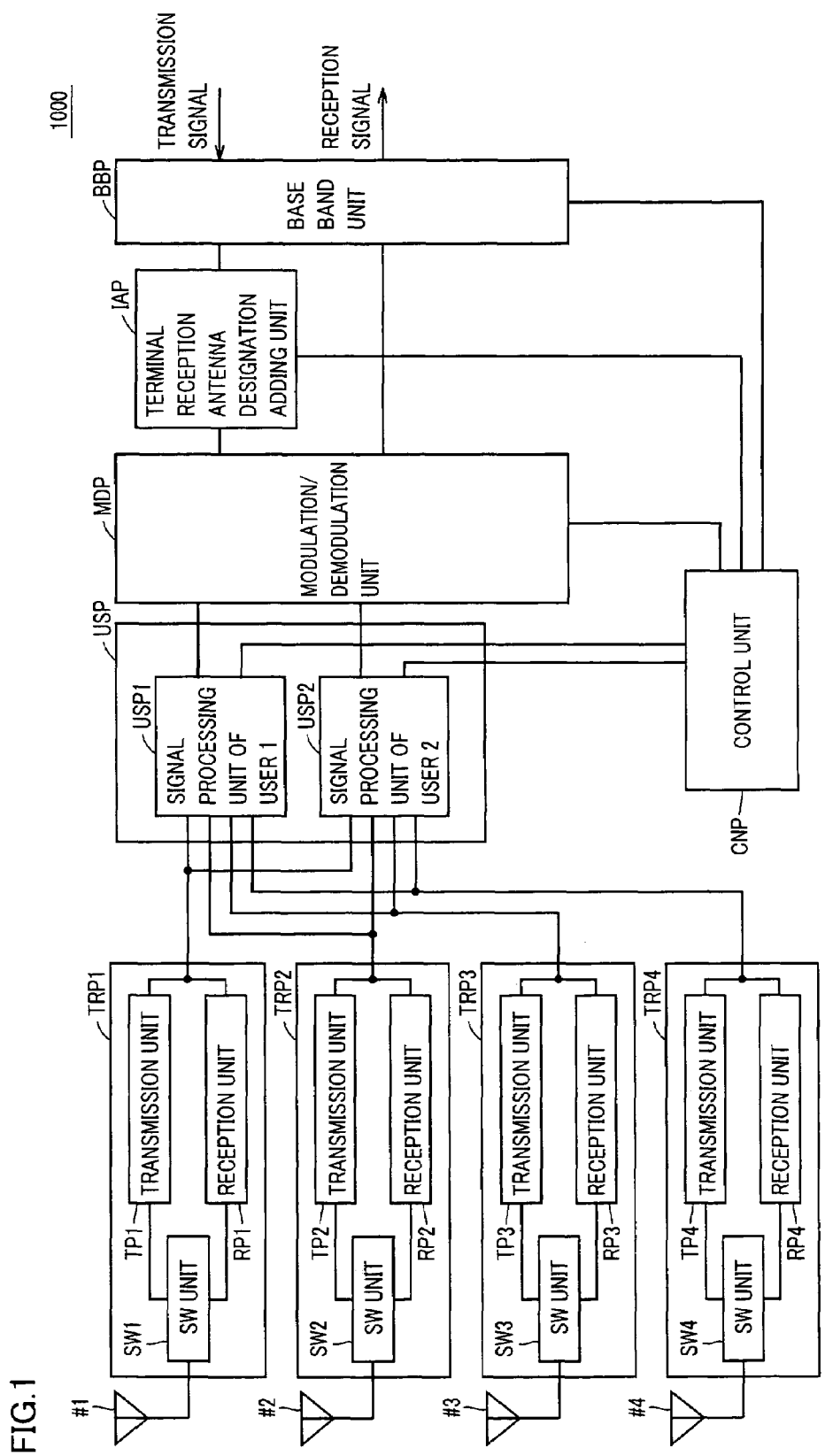
FIG. 1 is a schematic block diagram showing a configuration of an SDMA base station 1000 according to a first embodiment of the present invention.

FIG. 1 is a schematic block diagram showing a structure of an SDMA base station 1000 according to a first embodiment of the present invention.

Referring to FIG. 1, SDMA base station 1000 includes transmission and reception units TRP1–TRP4 applying transmission signals to an array antenna composed of a plurality of antennas #1–#4, or receiving reception signals, a signal processing unit USP1 receiving signals from transmission and reception units TRP1–TRP4 to carry out processing of signals corresponding to, for example, a user 1, a signal processing unit USP2 receiving signals from transmission and reception units TRP1–TRP4 to carry out signal processing of signals corresponding to a user 2, a modulation-demodulation unit MDP to modulate a signal to be applied to signal processing units USP1 and USP2, or to demodulate signals from signal processing units USP1 and USP2, a baseband unit BBP generating digital signals to be transmitted and received to and from signal processing units USP1 and USP2 via modulation-demodulation unit MDP, a control unit CNP controlling the operation of SDMA base station 1000, and a terminal receiving antenna designation adding unit IAP to add, in accordance with designation from control unit CNP, control information to designate an antenna to be used at the user terminal, as well as type information indicating the type of base station 1000, i.e., whether base station 1000 is a base station that carries out nondirectional transmission and reception or an SDMA base station, with respect to a transmission signal that is provided from baseband unit BBP to modulation-demodulation unit MDP.

Transmission and reception unit TRP1 includes a transmission unit TP1 to carry out high frequency signal processing in a transmission mode, a reception unit RP1 to carry out high frequency signal processing in a reception mode, and a switch unit SW1 to switch the connection of antenna #1 with respect to transmission unit TP1 or reception unit RP1 depending on whether in a transmission mode or a reception mode. The remaining transmission and reception units TR2–TR4 have a similar configuration.

The above description is based on the case where the number of antennas is 4 and there are 2 users. Generally, the number of antennas is N (n: natural number), and multiple users as many as those corresponding to the degree of freedom based on the number of antennas are allowed.

Further, base station 1000 can also conduct non-directional transmission by setting the transmission weight to zero except for a certain antenna under control of control unit CNP. The same applies for reception, allowing non-directional reception. Although not particularly limited, the function of control unit CNP can be realized, based on a computer program, by a processor that sequentially executes the procedure designated by the program.

Figure 2:
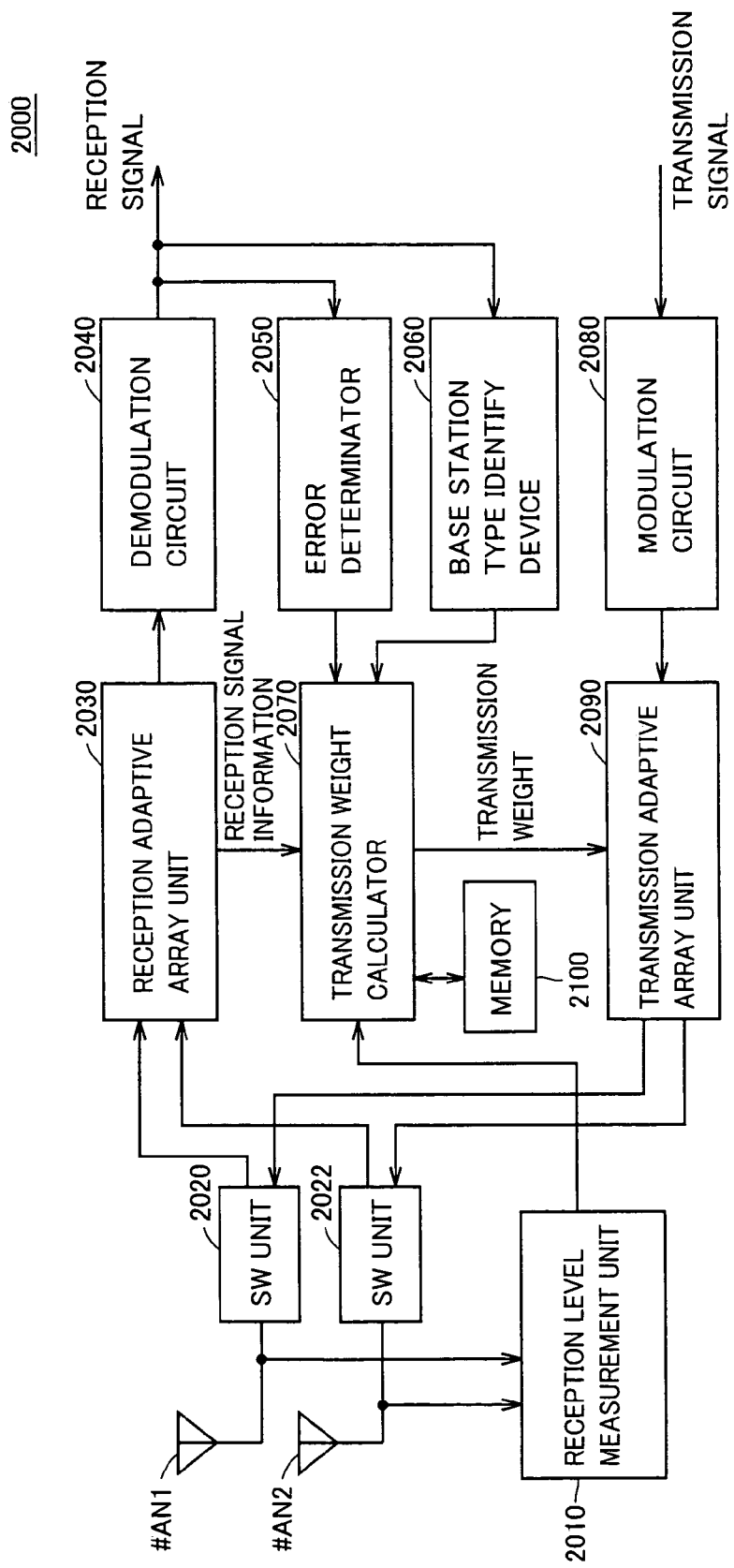
FIG. 2 is a schematic block diagram to describe a configuration of an adaptive array terminal 2000 of the present invention.

FIG. 2 is a schematic block diagram to describe a configuration of an adaptive array terminal 2000 of the present invention.

Referring to FIG. 2, adaptive array terminal 2000 includes an adaptive array antenna composed of antennas #AN1 and

AN2 to carry out data transmission and reception, a reception level measurement unit 2010 measuring the reception levels of antennas #AN1 and #AN2, switch units 2020 and 2022 applying a transmission signal to antennas #AN1 and #AN2, respectively, in a transmission mode, and passing through reception signals from the antenna in a reception mode, a reception adaptive array unit 2030 receiving and carrying out adaptive array processing on signals from switch units 2020 and 2022 to separate a signal from a desired base station, and a demodulation circuit 2040 to carry out a demodulation process on a signal from reception adaptive array unit 2030 to extract a baseband signal.

Adaptive array terminal 2000 further includes an error determinator 2050 to determine the amount of error of the reception signal according to the above-described CRC, based on an output from demodulation circuit 2040, a base station type identify device 2060 to identify, based on an output from demodulation circuit 2040, whether the base station is a base station that carries out transmission and reception in accordance with the SDMA system or a base station of another type, a transmission weight calculator 2070 to calculate transmission weights based on the reception signal information from error determinator 2050 and base station type identify device 2060 and the reception signal information from reception adaptive array unit 2030, and a memory 2100 to retain in advance phase information and the like for control of transmission directivity, as will be described afterwards.

As used herein, "reception signal information" implies information that characterizes the signal received at the base station such as the above-described reception level and reception error, control information from the base station, a reception response vector, and the like. In the present invention, the control method of transmission directivity is modified conforming to "reception signal information" at a terminal 2000 capable of adaptive array control in both transmission and reception modes, as will be described afterwards.

Adaptive array terminal 2000 further includes a modulation circuit 2080 receiving a transmitted baseband signal to carry out a modulation process, and a transmission adaptive array unit 2090 receiving an output from modulation circuit 2080 and transmission weights from transmission weight calculator 2070 to carry out transmission adaptive array processing.

As will become apparent by the description set forth below, adaptive array terminal 2000 is at least characterized in that sudden change of the transmission weight to cause degradation in communication quality is suppressed by transition from an operation mode in which the reception weight and transmission weight are adaptively altered to an operation mode that adds a predetermined constraint on the reception weight and transmission weight in accordance with "reception signal information", in response to designation from base station 1000.

Although not particularly limited, the function of adaptive array terminal 2000 can be realized, based on a computer program, by a processor not shown directed to sequentially execute the procedure designated by the program, controlling the operation of respective structural elements of adaptive array terminal 2000.

The operation of transmission weight calculator 2070, among the configuration of adaptive array terminal 2000, will be described in further detail hereinafter.

It is assumed that transmission weight calculator 2070 conducts transmission and reception selectively using a transmission directivity control method that will be described hereinafter, based on the above-described "reception signal information". As used herein, each operating mode based on designation of "a transmission directivity control method" is called a "transmission mode". Further, "a reception directivity control method" in the reception mode can be selectively modified at adaptive array terminal 2000. Respective modes that operate under the specified reception directivity control method is called a "reception mode".

(1. When Copying Reception Weight as Transmission Weight)

When reception weights are to be copied, transmission weight calculator 2070 receives reception weights from reception adaptive array unit 2030, and transfers the same as the transmission weights. If the communication status is favorable, communication having the interference with respect to another terminal removed can be effected by establishing directivity in transmission and reception also at the terminal side.

(2. When Calculating Transmission Weight Based on Reception Response Vector)

Transmission weight calculator 2070 can estimate a reception response vector for a transmission mode based on a reception response vector of a signal from a terminal in the reception mode, and conduct calculation of transmission weights based on the estimated reception response vector in accordance with the specified operation mode. This is advantageous in that, if the communication status is favorable, optimum communication directivity can be realized of a higher level as compared to the case where reception weights are simply copied and used as the transmission weights.

A method of obtaining transmission weights based on such an estimated value of a reception response vector will be described briefly hereinafter. The reception response vectors at the uplink line slot are sequentially obtained, which are extrapolated by a predetermined function (for example, linear function) until the time of transmission to estimate the reception response vector for transmission.

Upon obtaining an estimated value of a reception response vector at the transmission time point as described above, a transmission weight vector can be obtained by any of the three following methods.

2-i) Method by Orthogonalization

A weight vector $W(1)(i)=[wtx_{11}, wtx_{12}, wtx_{13}, wtx_{14}]$ at time t=iT (i: natural number, T: unit time interval) of user PS1 will be considered. In order to direct null to user PS2, the conditions set forth below are to be satisfied.

It is assumed that the propagation path (reception response vector) predicted for user PS2 is $V(2)(i)=[h1'(2)(i), h2'(2)(i), h3'(2)(i), h4'(2)(i)]$. Here, hp'(q) (i) is a predicted value of the reception coefficient vector for the p-th antenna for the q-th user with respect to time i. Similarly, it is assumed that propagation path $V(1)(i)$ is predicted for user PS1.

Here, $W(1)(i)$ is determined such that a relation of $W(1)(i)^T V(2)(i)=0$ is established. As constraints, the following conditions of c1) and c2) are imposed.

c1) $W(1)(i)^T V(1)(i)=g$ (a constant value)

c2) $\|W^{(1)}(i)\|$ is minimized.

Condition c2) is comparable to minimizing the transmission power.

2-ii) Method Using Spurious Correlation Matrix

Here, the adaptive array consists of some antenna elements, and a portion controlling each element weight value, as set forth above. Generally, when the input vector of the antenna is represented as $X(t)$ and the weight vector is represented as W, an optimal weight $W_{opt}$ will be given in the following equation (Wiener solution), if the weight vector is controlled so as to minimize the mean square error between an output $Y(t)=W^T X(t)$ and a reference signal d(t) (MMSE standard: minimum mean square error standard).

$$W_{opt}=R_{xx}^{-1}r_{xd} \quad (19)$$

Here, the following equations have to be satisfied.

$$R_{xx}=E[x^*(t)^T(t)] \quad (20)$$

$$r_{xd}=E[x^*(t)d(t)] \quad (21)$$

Here, $Y^T$ represents the transposition of Y, Y* represents a complex region of Y, and E[Y] represents the ensemble average. Using the weight value, the adaptive array generates an array pattern so as to suppress unnecessary interfering waves.

In the method using a spurious correlation matrix, the foregoing equation (21) is calculated with a spurious correlation matrix as set forth below.

That is, a weight vector W(k) (i) for user k is calculated with an estimated complex reception signal coefficient h'(k)n (i). When an array response vector for the k-th user is represented as V(k) (i), the weight vector can be obtained in the following manner.

$$V^{(k)}(i)=[h'_1{}^{(k)}(i),h'_2{}^{(k)}(i) \ldots , h'_N{}^{(k)}(i)] \quad (22)$$

Here, an autocorrelation matrix Rxx(i) of an assumed reception signal at t=iT is expressed in the following equation, using V(k)(i).

$$R_{xx}(i) = \sum_{k=1}^{K} V^{(k)*}(i)V^{(k)T}(i) + NI \quad (23)$$

Here, N is an assumed noise term added so that Rxx (i) is regular. For example, $N=1.0\times10^{-5}$ in the calculation in the present invention.

A correlation vector rxd(i) of the reception signal with the reference signal is expressed in the following equation.

$$r_{xd}(i)=V^{(k)*}(i) \quad (24)$$

Therefore, the weight for the downlink at time t=iT can be obtained with equations (21), (25), and (26).

The inverse matrix of equation (25) can optimally be calculated for user k with a lemma of the inverse matrix. In the case for two users, in particular, the weight can be calculated by the following simple equations.

$$W^{(1)}(i)=(p_{22}+N)V^{(1)*}(i)-p_{12}V^{(2)*}(i) \quad (25)$$

$$W^{(2)}(i)=(p_{11}+N)V^{(2)*}(i)-P_{21}V^{(1)*}(i)$$

$$p_{ij}=V^{(i)H}(i)V^{(j)}(i) \quad (26)$$

A method for calculating a weight vector when the autocorrelation matrix is given as described above is disclosed in, for example, the following references: T. Ohgane, Y. Ogawa, and K. Itoh, Proc. VTC '97, vol. 2, pp. 725–729, May, 1997; or, Tanaka, Ohgane, Ogawa, Itoh, Technical Report of IEICE, vol. RCS98–117, pp. 103–108, October 1998.

2-iii) Method of Directing Beam to User PS1

When attention is paid only to directing a beam to user PS1, only the following equation has to be satisfied.

$$W(1)(i)=V(1)(i)^*$$

By the above-described methods, transmission weights can be calculated based on the estimated reception response vector.

(3. When Transmitting with Amplitude and Phase of Transmission Weight Fixed: Directivity Fixed Transmission)

Alternatively, transmission weight calculator 2070 carries out a process to fix the amplitude with equal gain, and also to fix the phase for calculating and outputting transmission weights based on the phase information stored in memory 2100.

(4. When Transmitting While Altering Phase with Fixed Amplitude of Transmission Weight: Directivity Sub-Fixed Transmission)

In the case where a mode of fixing the amplitude at equal gain and gradually altering the phase in accordance with designation from the control unit is specified, the reception information (reception weight, reception response vector) is subjected to weighted mean with the past reception information to calculate and output transmission weights from the phase.

For example, the weighted mean between a past weight Wrx_old and the current reception weight Wrx is defined by the following equation.

$$Wrx=(1-\alpha)Wrx\_old/|Wrx\_old|+\alpha Wrx/|Wrx|$$

where $1<\alpha<0$, and $\alpha$ a predetermined value.

The phase is extracted from this weight Wrx, and a weight is generated based on that phase information.

(5. When Transmitting in Reception Level Select Transmission Diversity Mode)

In the case where a mode of selecting an antenna of high reception level is specified, transmission weight calculator 2070 sets the weight of the antenna number to be selected to 1, and the weights of the antennas of other antenna numbers to 0 based on the measurement result from the reception level measurement unit.

(6.1 When Carrying Out 1-Antenna Fixed Transmission)

In the case where a mode of transmitting in a fixed manner through only one of the antennas is specified based on the designated transmission mode, the weight of one selected antenna number is set to 1 in accordance with designation from the base station, and the weights of antennas of other antenna numbers is set to 0 by transmission weight calculator 2070. Alternatively, the antenna to be selected when the 1-antenna fixed transmission mode is specified may be determined in advance. In this case, the base station only has to instruct terminal 2000 of designation of the 1-antenna fixed transmission mode.

(7. When Carrying Out Maximum Ratio Composite Transmission)

In the case where maximum ratio composite transmission is specified, transmission weight calculator 2070 sets the transmission weights such that the output signal intensity is maximum, irrespective of the directivity of the signal output from the antenna.

The above description is based on a transmission mode. Likewise in a reception mode, the operation of various reception modes such as an adaptive array reception mode, maximum ratio composite reception, reception level select diversity, 1-antenna fixed reception and the like can be realized by setting the values of the reception weights in accordance with the designation.

Respective operation modes set forth above will be described in further detail hereinafter

[Operation Example when Base Station is a Base Station that Carries Out Non-Directional Transmission]

The following description corresponds to an operation of adaptive array terminal 2000 when base station 1000 effects non-directional transmission, and space-multiplexed communication is not conducted. In other words, an operation based on the case where the base station is not an SDMA base station in accordance with the service area will be described.

Figure 3:
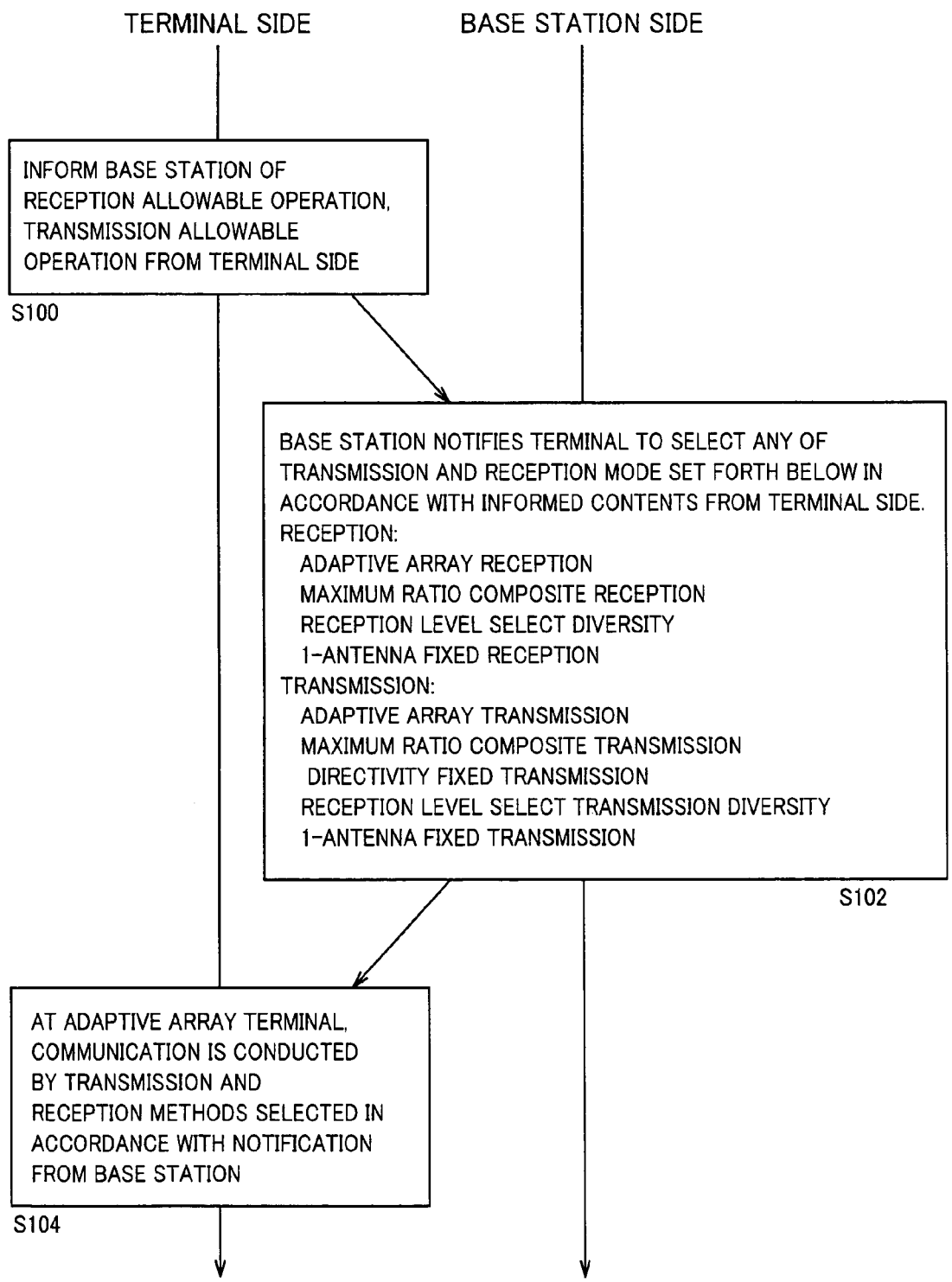
FIG. 3 is a flow chart to describe an operation of adaptive array terminal 2000.

FIG. 3 is a flow chart to describe an operation of adaptive array terminal 2000 in such a case.

Referring to FIG. 3, terminal 2000 informs base station 1000 of a reception allowable operation and transmission allowable operation (step S100).

Informing a transmission allowable operation may be effected when, but not particularly limited, degradation in the reception status is detected by an error determinator 2050 at terminal 2000.

From the base station side, terminal 2000 is notified with control information added to transmission information by terminal reception antenna designation adding unit IAP such that any of the transmission and reception modes set forth below is selected in accordance with the informed contents from the terminal 2000 side (step S102).

For example, designation can be made so as to carry out adaptive array reception for reception and adaptive array transmission for transmission.

Additionally in reception, designation can be made to carry out maximum ratio composite reception so that the reception power is at the highest level, to carry out reception level select diversity reception so as to select an antenna of higher reception level for reception at adaptive array terminal 2000, or to carry out a 1-antenna fixed reception operation specifying that any one of the antennas is fixedly used irrespective of the reception level.

For the transmission mode, a maximum ratio composition transmission mode can also be specified so as to output a transmission signal at the highest transmission power. Alternatively, directivity fixed transmission corresponding to transmission with the magnitude and phase of the transmission weight fixed, or directivity sub-fixed transmission can be designated so as to have a predetermined directivity (direction of transmission).

Furthermore, a reception level select transmission diversity operation mode can be designated to select an antenna of higher reception level for transmission in accordance with the reception level. Alternatively, a 1-antenna fixed transmission mode using one of the antennas in a fixed manner, independent of the reception level, can be specified.

At the terminal side, transmission is effected in accordance with the selected transmission and reception method in response to such designation from the base station side (step S104).

[When Base Station is a Base Station that Effects Adaptive Array Transmission]

Figure 4:
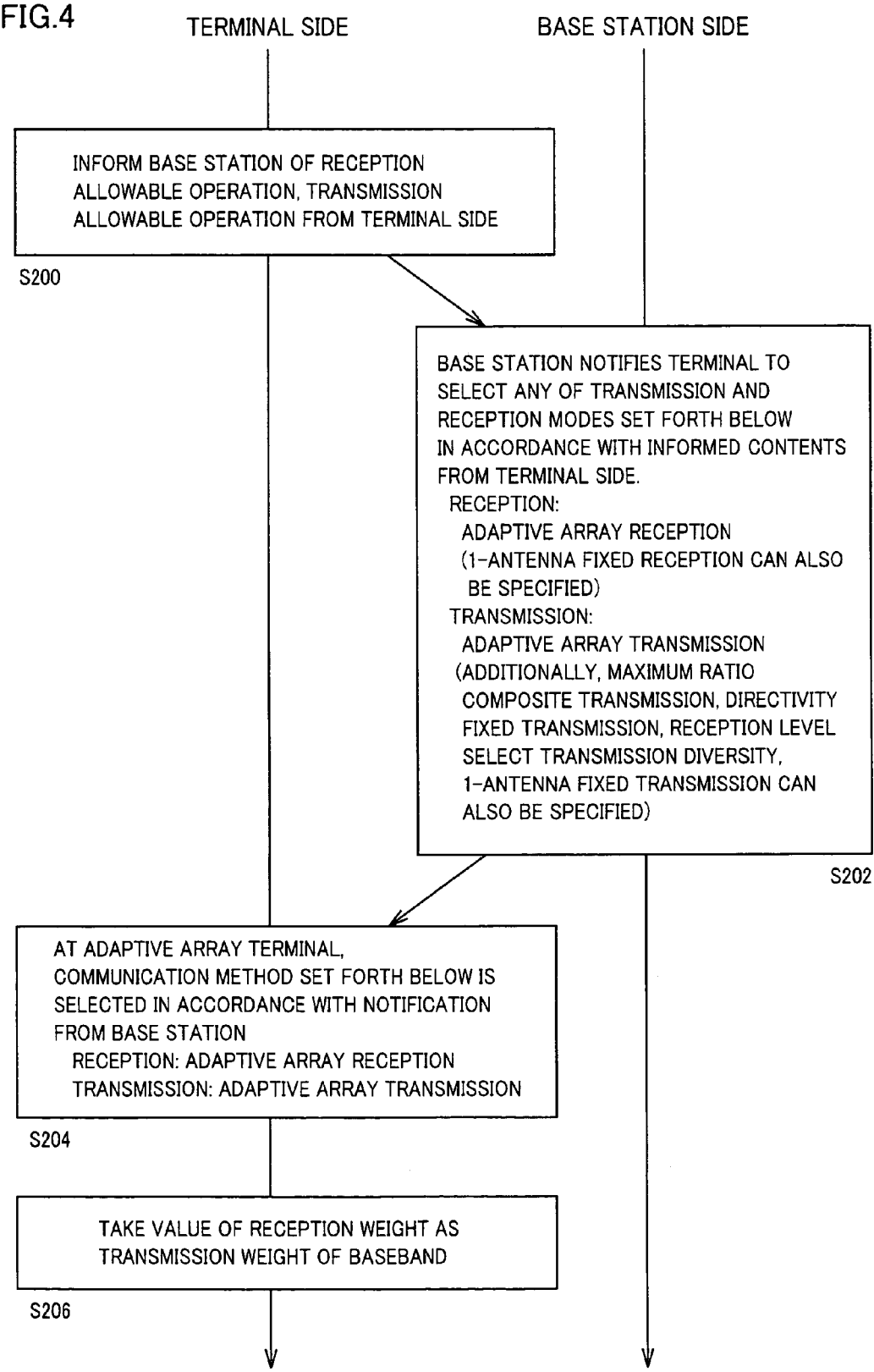
FIG. 4 represents a process flow when base station 1000 transmits a signal having directivity to adaptive array terminal 2000.

FIG. 4 represents the processing flow when base station 1000 effects adaptive array transmission i. e. when base station 1000 effects signal transmission having directivity with respect to adaptive array terminal 2000.

Referring to FIG. 4, the terminal side informs the base station of a reception allowable operation and transmission allowable operation (step S200).

Base station 1000 selects and notifies the terminal of a transmission and reception mode in accordance with the informed contents from the terminal 2000 side (step S202). For example, adaptive array reception can be designated for the reception mode, and adaptive array transmission can be designated for the transmission mode.

It is to be noted that, if base station 1000 effects adaptive array transmission, 1-antenna fixed reception can be designated for the reception mode, and any of maximum ratio composite transmission, directivity fixed transmission, reception level select transmission diversity, and 1-antenna fixed transmission can be selected.

Then, adaptive array terminal 2000 responds to the notification from base station 1000 to select an adaptive array reception mode for the reception mode and an adaptive array transmission mode for the transmission mode (step S204). At this stage, the reception weights are directly copied and used as the baseband transmission weights (step S206) to suppress rapid change in the transmission weights at adaptive array terminal 2000.

Alternatively, calculation weights can be calculated and used as the baseband transmission weights based on the transmission response vector estimated from the reception response vector information.

[When Base Station is SDMA Base Station]

Figure 5:
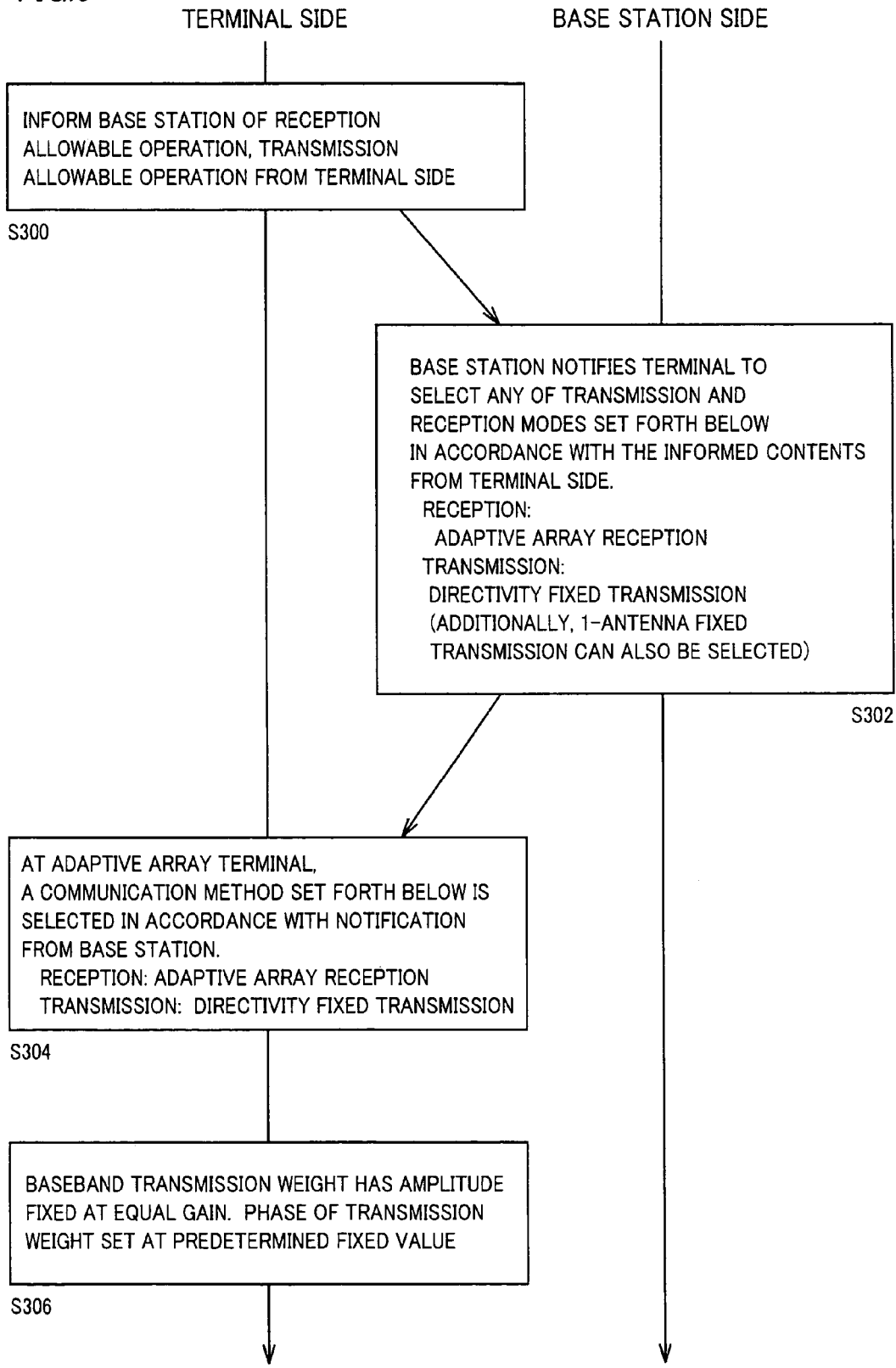
FIG. 5 is a flow chart to describe a first transmission and reception flow when base station 1000 is an SDMA base station.

FIG. 5 is a flow chart to describe a first transmission and reception flow when base station 1000 is an SDMA base station. In other words, the flow chart corresponds to the case where base station 1000 conducts path division multiple connection with a plurality of terminals by effecting adaptive array processing.

Referring to FIG. 5, the base station is informed of the reception allowable operation and transmission allowable operation from the terminal side (step S300).

At base station 1000 side, designation of the reception and transmission modes is notified in accordance with the informed content from terminal 2000 side (step S302). At this stage, an adaptive array reception mode is designated for the reception process whereas directivity fixed transmission is designated for the transmission mode in accordance with base station 1000 being an SDMA station. Alternatively, 1-antenna fixed transmission can be selected.

Then, terminal 2000 designates the operation mode of transmission weight calculator 2070 so as to effect reception by adaptive array reception and transmission by directivity fixed transmission in accordance with the notification from base station 1000 (step S304).

In response, at the terminal side, the amplitude of the baseband transmission weight is fixed at equal gain, and the phase of the transmission weight is fixed at a predetermined value (step S306).

As an arbitrary value of the value of the phase, the value can be fixed as set forth below. At adaptive array terminal 2000, such an arbitrary value of phase is recorded in memory 2100. Directivity fixed transmission is effected using this phase value.

(ant 1, ant 2, ant 3, . . . , ant N)=(0°, 0°, 0°, . . . 0°)
(ant 1, ant 2, ant 3, . . . , ant N)=(0°, 90°, 0°, . . . 90°)
(ant 1, ant 2, ant 3, . . . , ant N)=(0°, 10°, 20°, . . . 360°)

Here, ant 1 represents the phase of antenna #1. In general, ant i (i=1, . . . N) represents the phase of antenna #i.

Figure 6:
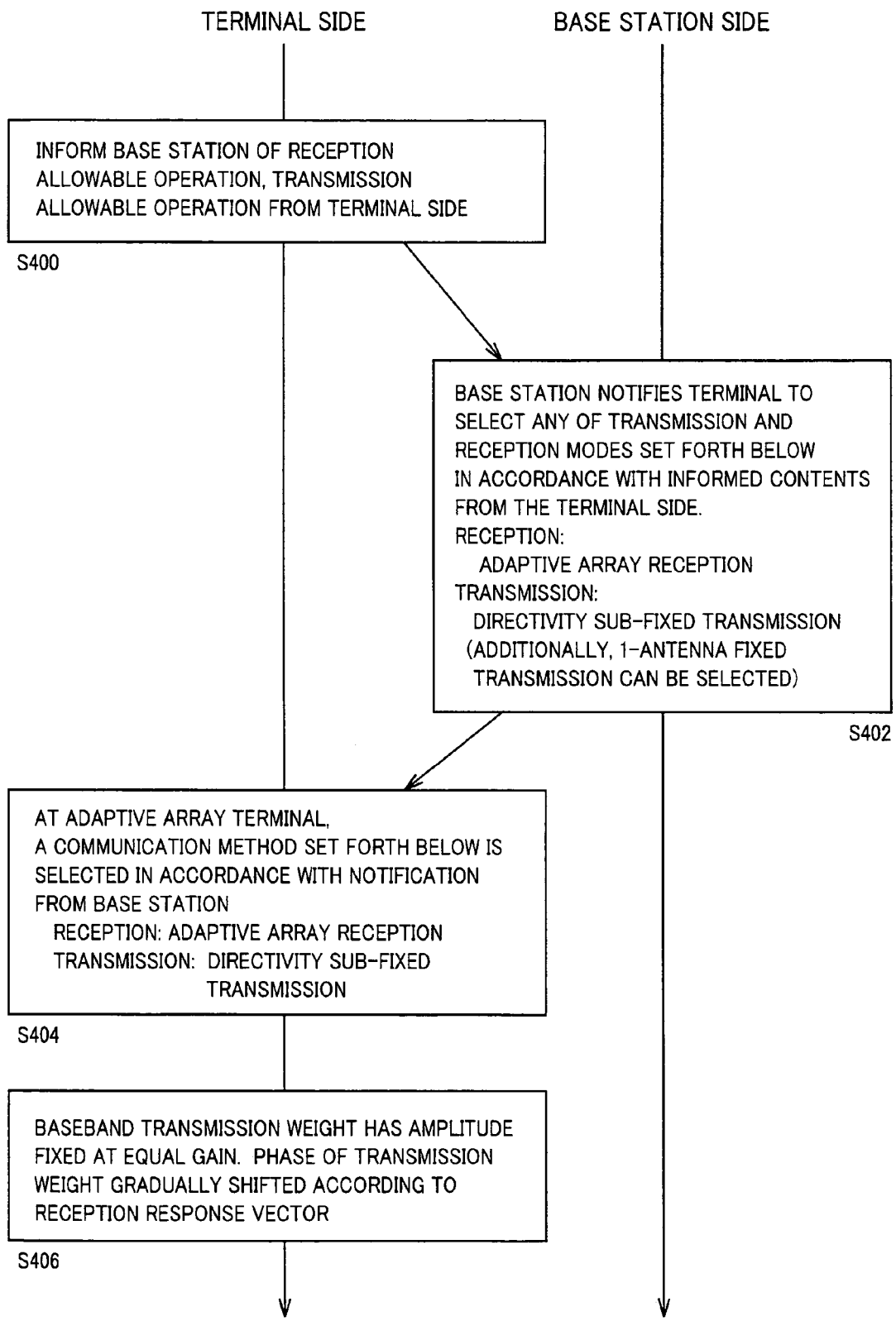
FIG. 6 is a flow chart exemplifying a second operation when base station 1000 is an SDMA base station.

FIG. 6 is a flow chart of a second operation example when base station 1000 is an SDMA base station.

In the example of FIG. 6, adaptive array terminal 2000 conducts directivity sub-fixed transmission in which the amplitude of the baseband transmission weight is fixed at equal gain, and the phase of the transmission weight is gradually shifted according to the reception response vector.

The gradually shifting process is effected as set forth below.

The weighted mean of the reception weight Wrx of the current frame and reception weight Wrx_old of the immediately preceding reception frame is obtained according to the equation set forth below. The phase of the transmission weight is determined by extracting the phase value of this weighted mean.

$$Wrx = (1-\alpha)Wrx\_old/|Wrx\_old|+\alpha Wrx/|Wrx|$$

where $1<\alpha<0$, $\alpha$ is a predetermined value.

The above description is based on a configuration in which sudden change in transmission weight is suppressed by gradually altering the phase according to the above-described procedure with the amplitude of the transmission weight fixed.

It is to be noted that, if the transmission weight is to be determined based on the weighted mean between the information of an old frame and information of the current frame, a configuration can be employed in which the weight is calculated from a reception response vector that is the weighted mean of, for example, the reception response vector estimated at the time of determining the transmission weight of the current frame and the reception response vector of an immediately preceding reception frame (or a reception response vector estimated by extrapolating at the time of transmission of the immediately preceding frame).

Alternatively, the weighted mean of a transmission weight Wtx calculated in the current frame and a transmission weight Wtx_old of an immediately preceding transmission frame can be obtained by the equation set forth below, which is newly taken as the transmission weight /Wtx of the current frame.

$$/Wtx=(1-\alpha)Wtx\_old+\alpha Wtx$$

Figure 7:
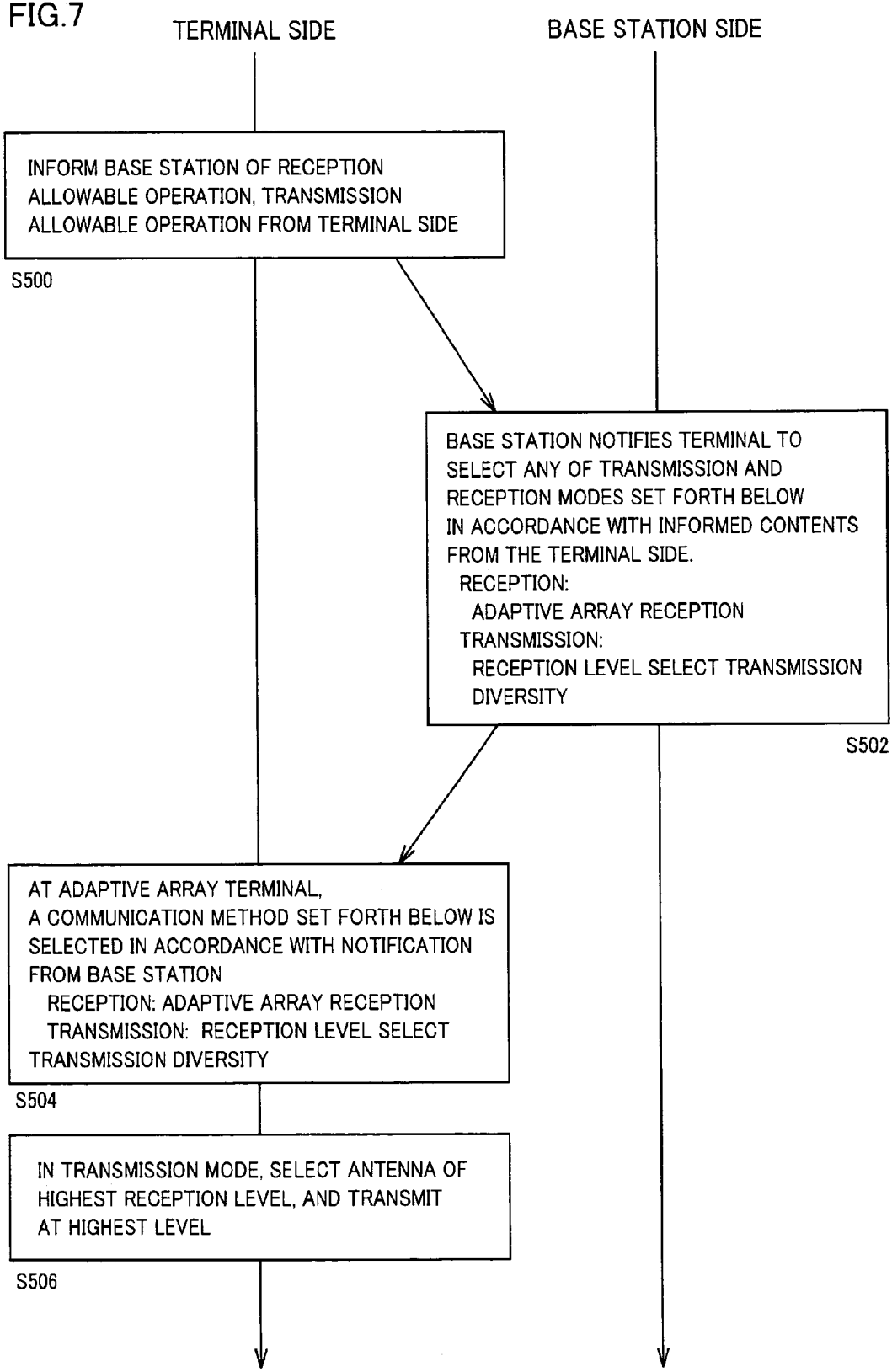
FIG. 7 is a flow chart exemplifying a third operation when base station 1000 is an SDMA base station.

FIG. 7 is a flow chart of a third operation example when base station 1000 is an SDMA base station.

In comparison with the configuration of FIG. 6, the example of FIG. 7 employs a configuration in which base station 1000 selects adaptive array reception for reception and reception level select transmission diversity for transmission and notifies the same as the transmission and reception mode in accordance with the informed contents from terminal 2000 side (step S502).

Accordingly, adaptive array terminal 2000 selects and sets the foregoing transmission operation mode in accordance with the notification from the base station (step S504). In a transmission mode, the antenna of highest reception level is selected for transmission (step S506).

SECOND EMBODIMENT

When directivity fixed or sub-fixed transmission is to be conducted at the adaptive array terminal in the first embodiment, the value stored in memory 2100 at the time of fabrication of adaptive array terminal 2000, for example, is employed for the transmission weight to be used.

In the second embodiment, a configuration is employed in which, when an adaptive array terminal 2200 of the second embodiment does not conduct adaptive array transmission and reception in accordance with the communication status, a plurality of fixed values to be used for the transmission weights are selectively collected and stored in advance in accordance with the communication status corresponding to respective usages of relevant fixed values, and a base station 1002 of the second embodiment designates selection and usage any of the plurality of transmission weights.

Figure 8:
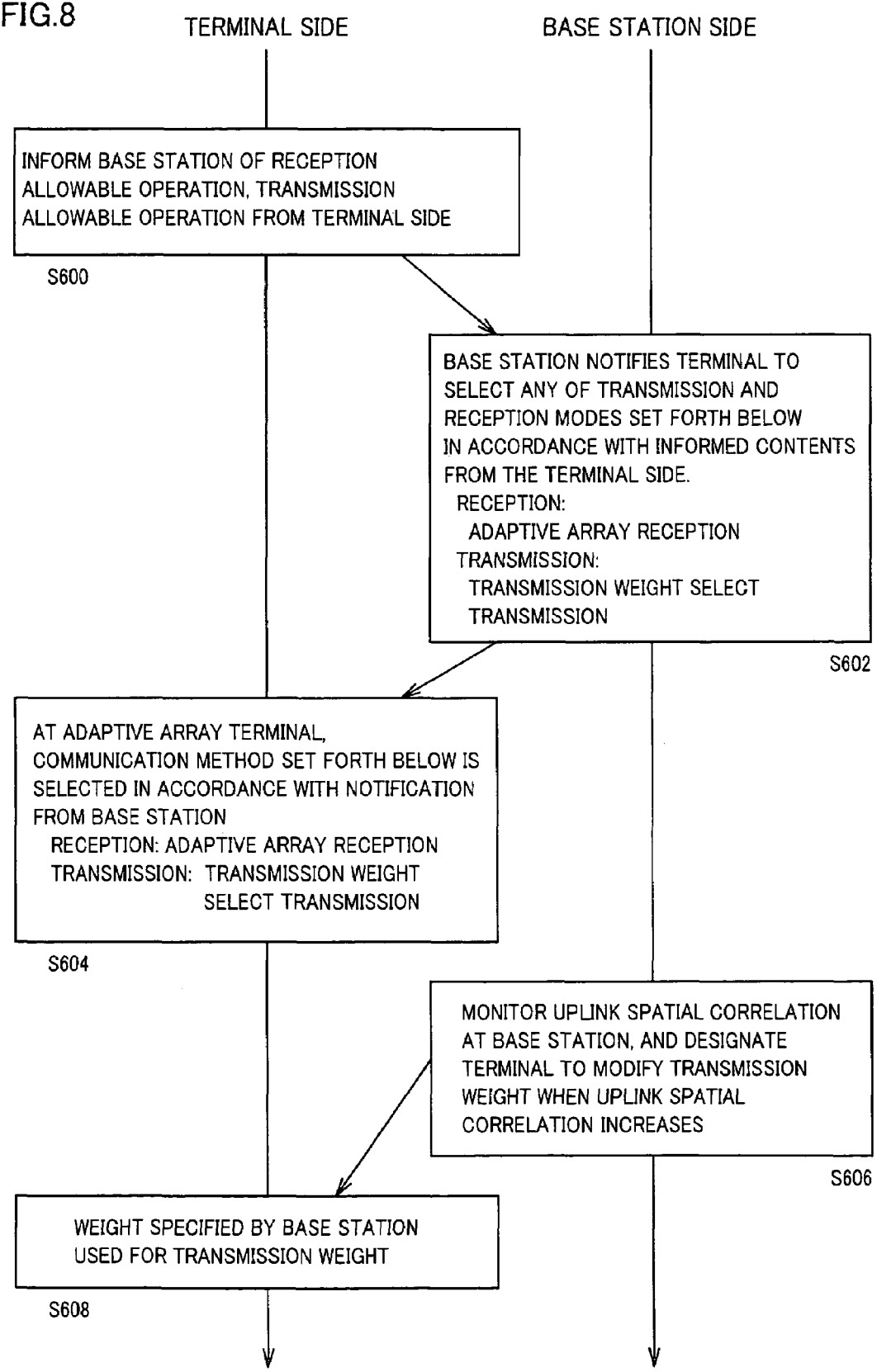
FIG. 8 is a flow chart to describe an operation when a terminal 2200 has transmission weight select capability and a base station 1002 is an SDMA base station.

FIG. 8 is a flow chart to describe the operation when terminal 2200 has transmission weight select capability, and base station 1002 is an SDMA station.

Referring to FIG. 8, the terminal 2200 side informs base station 1002 of a reception allowable operation and transmission allowable operation (step 600).

In accordance with the informed contents from the terminal, the base station designates, for example, an adaptive array reception mode for the reception mode, and transmission weight select transmission for the transmission mode (step 602).

In response, adaptive array terminal 2200 sets the aforementioned operation mode of adaptive array reception and transmission weight select transmission for the reception mode and transmission mode (step 604).

Base station 1002 monitors the spatial correlation between reception response vectors for respective signals from a plurality of terminals, and designates terminal 2200 to modify the transmission weight when the spatial correlation between upstream signals becomes high (step 606).

At the terminal 2200 side, signals are transmitted using the transmission weight modified according to the specification from base station 1002 (step 608).

Figure 9:
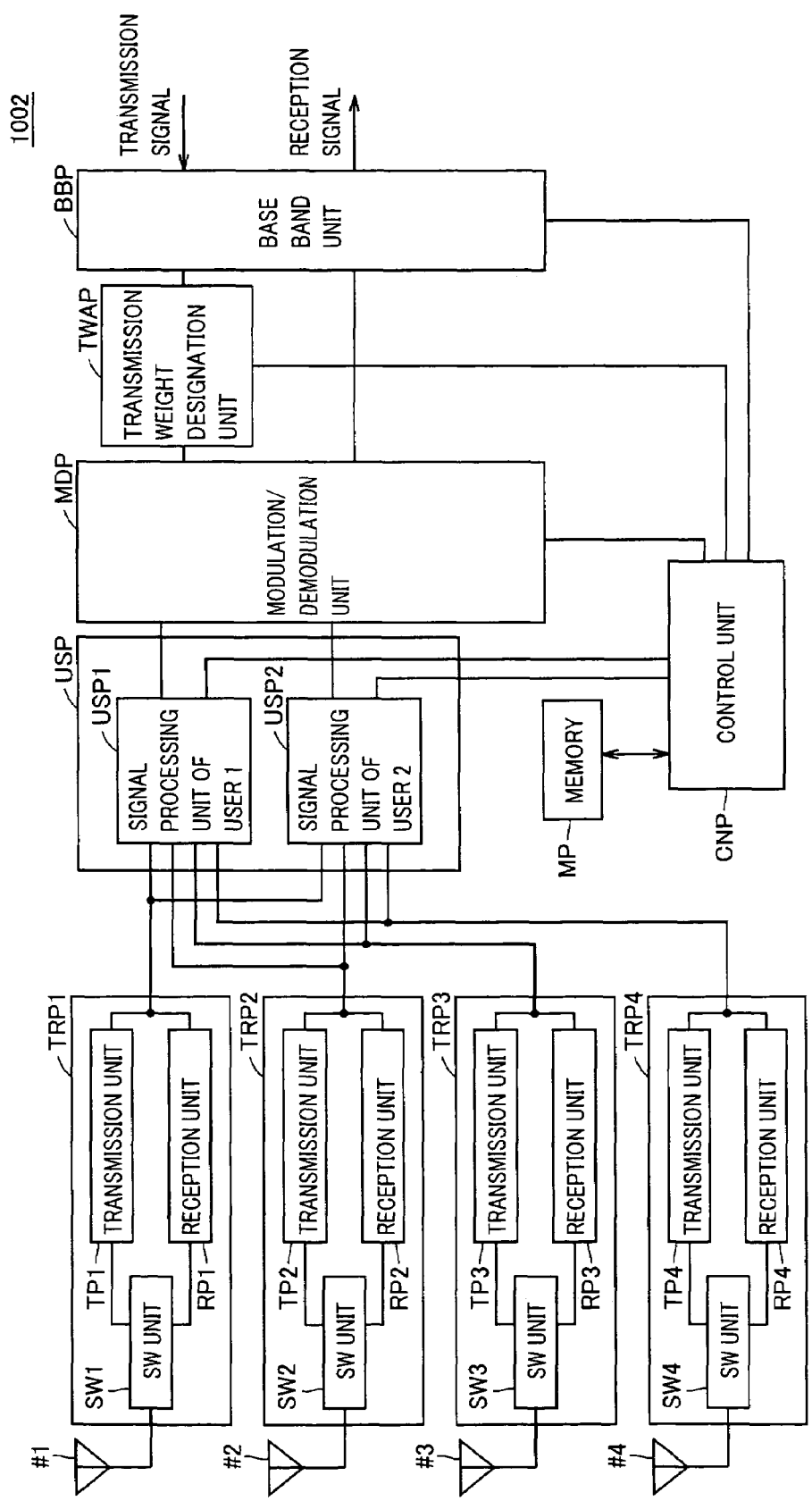
FIG. 9 is a schematic block diagram to describe a configuration of an SDMA base station 1002.

FIG. 9 is a schematic block diagram to describe a configuration of an SDMA base station 1002 to specify a transmission and reception mode with respect to adaptive array terminal 2200 having transmission weight select capability.

The difference from the configuration of SDMA base station 1000 of FIG. 1 lies in that terminal reception antenna designation adding unit IAP is replaced with a transmission weight designation unit TWAP to add transmission weight designation information to the baseband signal for transmission based on an output from baseband unit BBP in accordance with designation from control unit CNP, and a memory MP retaining the history of reception response vectors of a predetermined period of time for respective terminals, and output/input the same from/to control unit CNP.

The remaining configuration is similar to the configuration of SDMA base station 1000 of FIG. 1. The same corresponding elements have the same reference characters allotted, and description thereof will not be repeated.

Figure 10:
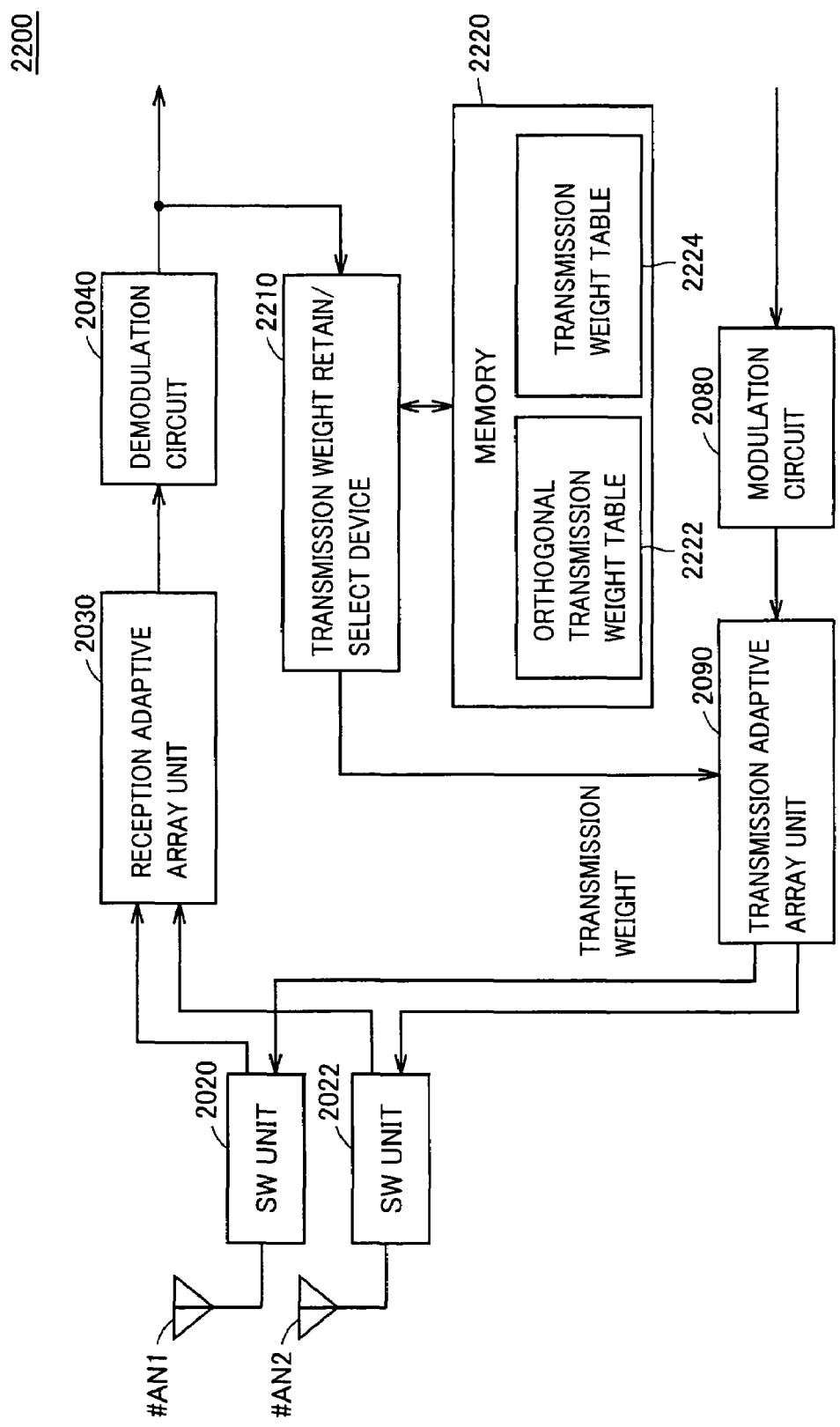
FIG. 10 is a schematic block diagram to describe a configuration of an adaptive array terminal 2200 having transmission weight select capability.

FIG. 10 is a schematic block diagram to describe a configuration of adaptive array terminal 2200 having transmission weight select capability.

The configuration of adaptive array terminal 2200 differs from that of adaptive array terminal 2000 of FIG. 2 in that there are provided a transmission weight retain/select device 2210 receiving transmission weight designation information from base station 1002, included in the signal output from demodulation circuit 2040, for designating a transmission weight select operation, and a memory 2220 to store an orthogonal transmission weight table 2222 and a transmission weight table 2224 for selection by transmission weight retain/select terminal 2210. Further, transmission adaptive array 2090 multiplies the signal of demodulation circuit 2080 by transmission weights based on the transmission weights from transmission weight retain/select device 2210, and provides the multiplied result to switch units 2020 and 2022.

The remaining features are similar to those of the configuration of adaptive array terminal 2000 shown in FIG. 2. The same elements have the same reference characters allotted, and description thereof will not be repeated.

In FIG. 10, reception level measurement unit 2010, error determination circuit 2050, base station type identify device 2060, transmission weight calculator 2070 and memory 2100 shown in FIG. 2 are omitted. In order to allow adaptive array terminal 2200 to carry out an operation similar to that of adaptive array terminal 2000 of the first embodiment selectively in accordance with designation from base station 1002, a configuration in which such structural elements are provided in adaptive array terminal 2200 can be employed.

Figure 11:
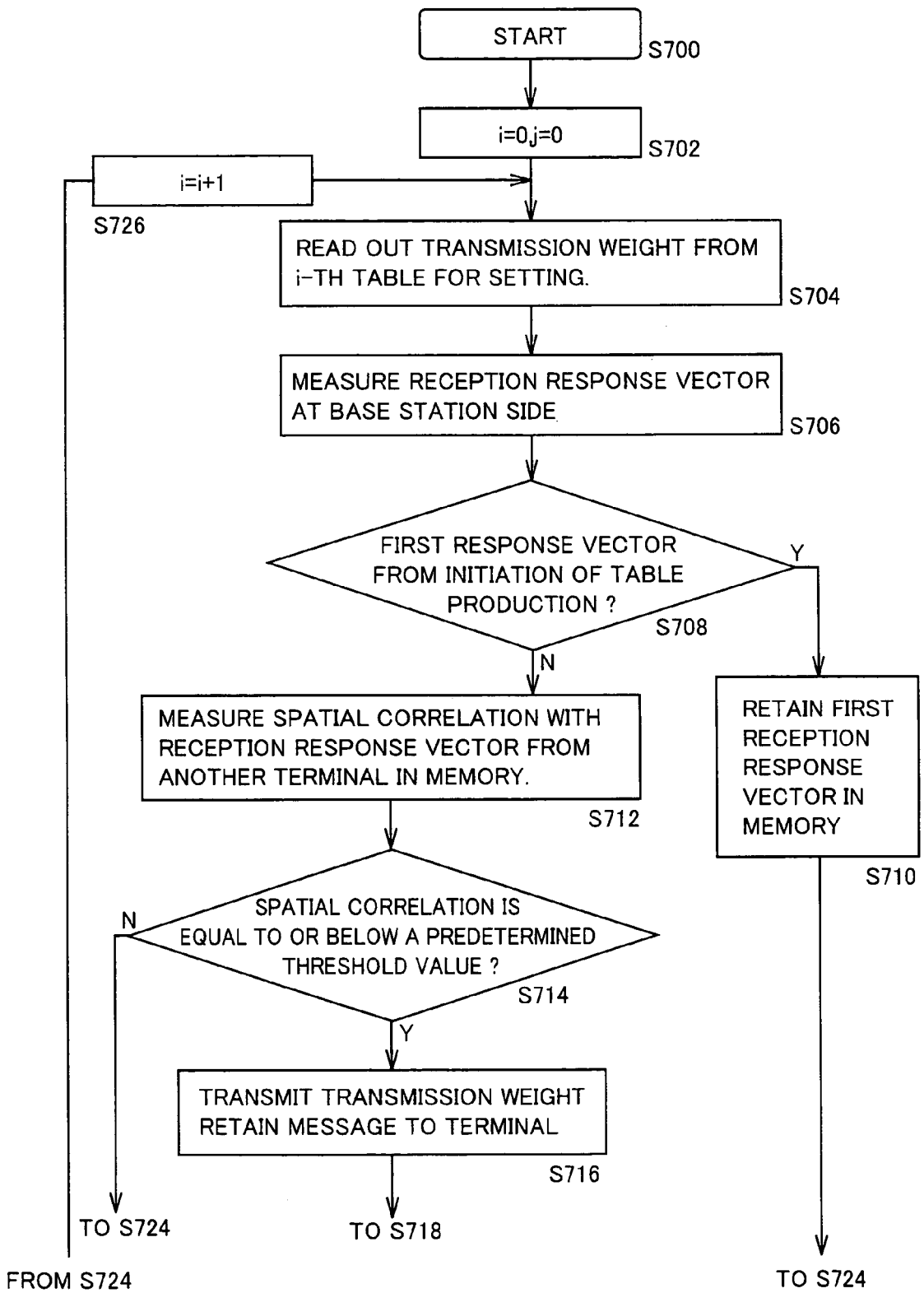
FIG. 11 is a first flow chart to describe a processing flow of table production with respect to a memory 2220.
Figure 12:
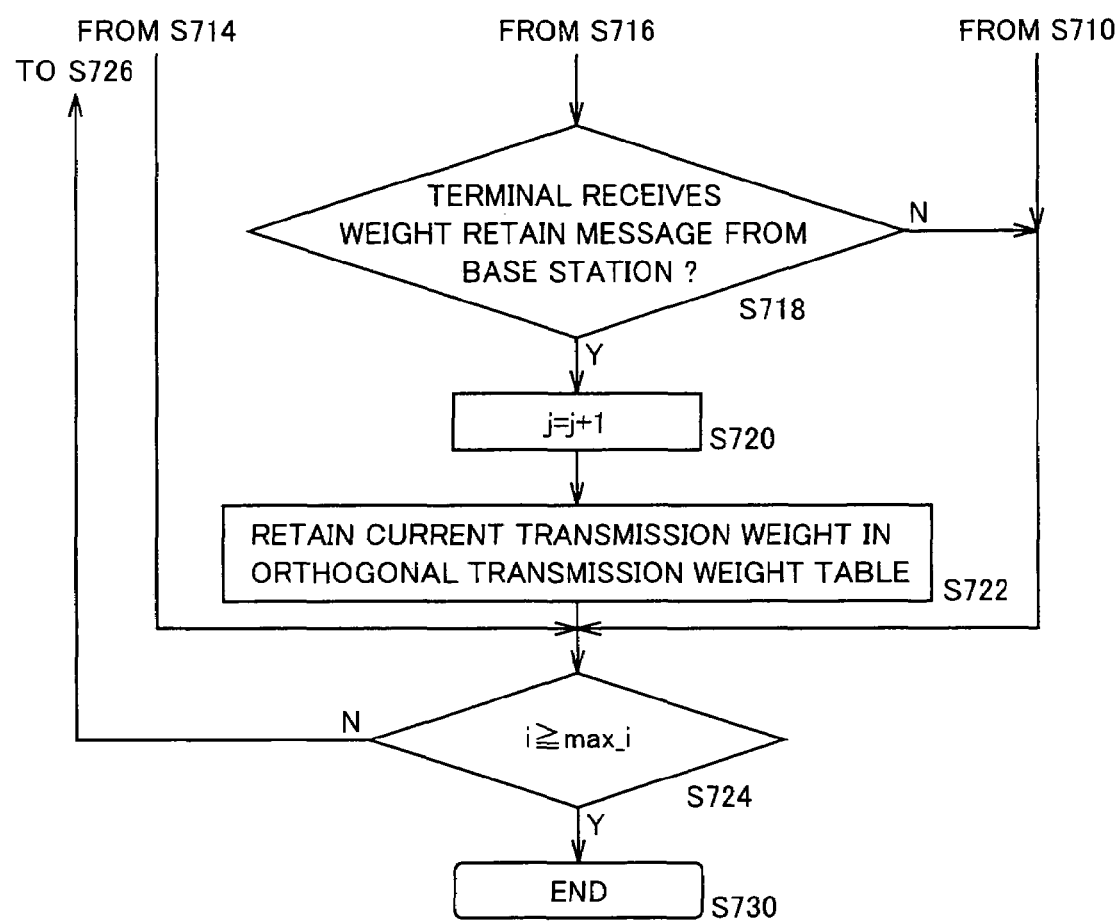
FIG. 12 is a second flow chart to describe a processing flow of table production with respect to memory 2220.

FIGS. 11 and 12 are first and second flow charts, respectively, to describe a table production process flow with respect to memory 2220 for the transmission weight select capability of adaptive array terminal 2200.

Referring to FIG. 11, upon initiation of the process (step S700), the values of variables i and j are set to the initial value of 0 (step S702).

Transmission weight retain/select device 2210 of adaptive array terminal 2200 reads out the transmission weight from the i-th table in memory 2220 and sets the same as the transmission weight value (step S704). It is assumed that max_i transmission weights are prestored in transmission weight table 2224.

At the base station 1002 side, the reception response vector is measured while receiving signals output from adaptive array terminal 2200 with the selected transmission weight (step S706).

At base station 1002, determination is made whether it is the first reception response vector from the start of table production (step S708). When it is the first reception response vector, the value thereof is stored in memory MP (step S710).

When it is not the first reception response vector, base station 1002 measures the spatial correlation between a reception response vector with respect to a signal from terminal 2200 and a reception response vector from another terminal stored in memory MP (step S712).

When the spatial correlation is equal to or below a predetermined threshold value (step S714), transmission weight designation unit TWAP transmits a transmission weight retain message to terminal 2200 (step S716).

At terminal 2200, determination is made whether a weight retain message from base station 1002 is received or not (step S718). When the message is received, the value of variable j is incremented by 1 (step S720). The transmission weight at that time point is stored in the j-th table in orthogonal transmission weight table 2222 (step S722).

Then, determination is made whether the value of variable i is larger than a predetermined maximum value max_i (step S724). When not larger, the value of variable i is incremented by 1 (step S726), and the process returns to step S704.

When the first reception response vector is stored in memory MP at step S710, or when the spatial correlation is not equal to or below a predetermined value at step S714, or when the terminal has not received a weight retain message from the base station at step S718, the process proceeds to step S724.

When the value of variable i is equal to or above predetermined maximum value max_i at step S724, the process ends (step S730).

By such a process, the set of values of the orthogonal transmission weight vectors that allows communication of relatively small spatial correlation with another terminal in the current communication environment among the values retained in advance as transmission weight can be stored in memory 2220.

When the communication environment changes, the set of orthogonal transmission weight vector values can be updated by carrying out the process of steps S700–S730 again, as necessary.

Figure 13:
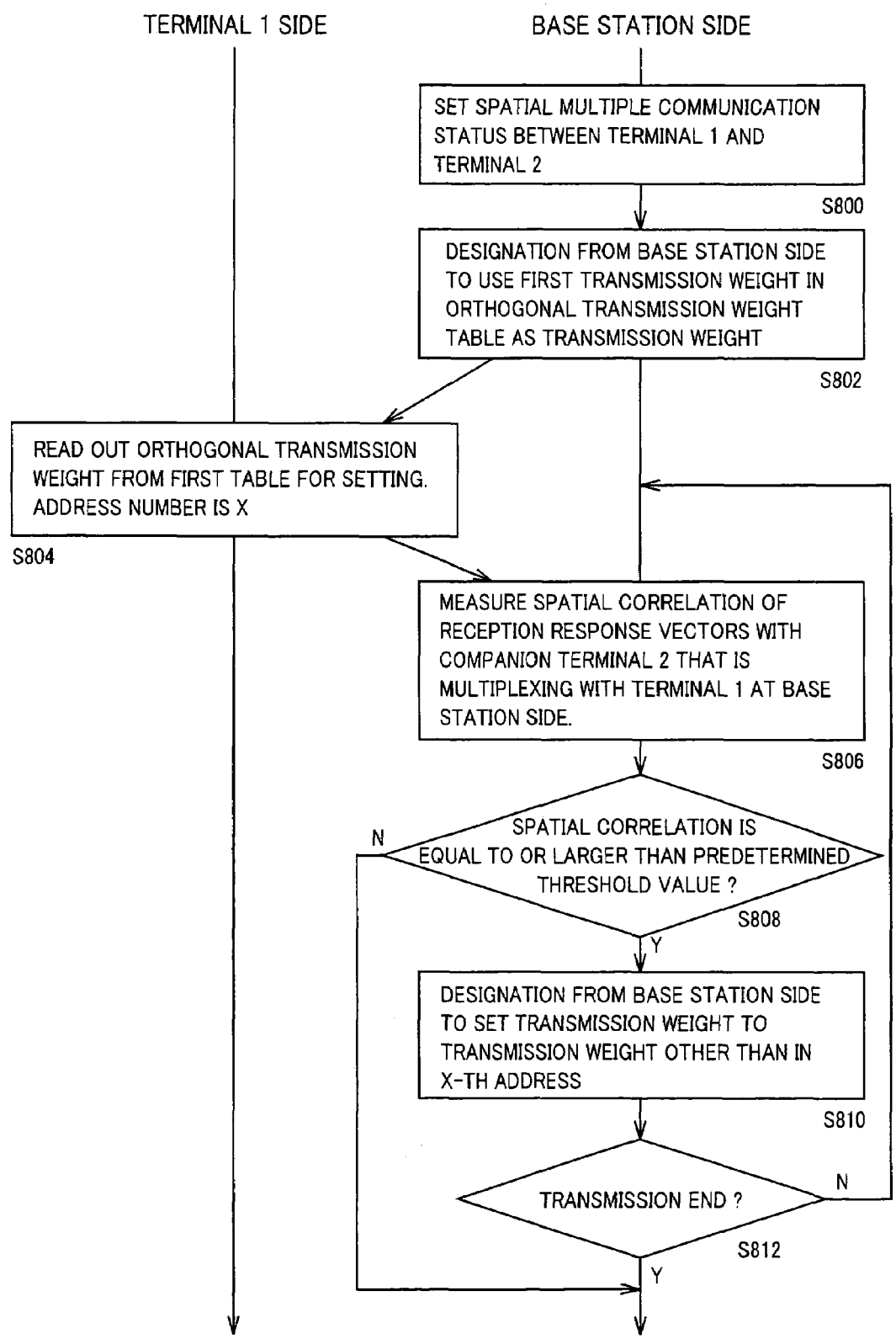
FIG. 13 is a flow chart to describe a method of communication between a terminal and a base station with a transmission weight selected.

FIG. 13 is a flow chart to describe a method of selecting a transmission weight for communication between a terminal and a base station.

At the base station 1100 side, spatial multiplex communication between terminals 1 and 2 having a configuration similar to that of adaptive array terminal 2200, for example, is set (step S800).

Designation is made from the base station 1002 side to terminal 1 to use the first transmission weight in the orthogonal transmission weight table as the transmission weight (step S802).

At adaptive array terminal 1, the orthogonal transmission weight is read out from the first table and set as the transmission weight (step S804). The number of the address where that transmission weight is set is X.

At the base station 1002 side, the spatial correlation between the reception response vector of terminal 1 and the reception response vector of companion terminal 2 that is multiplexing with terminal 1 is measured (step S806).

Then, determination is made whether the spatial correlation is equal to or larger than a predetermined threshold value (step S808). When the spatial correlation is equal to or larger than the predetermined threshold value, designation is made from the base station 1002 side to set the transmission weight to a transmission weight other than that in the Xth address (step S810).

Following this designation, determination is made whether transmission has ended or not (step S812). When transmission has not ended, the process returns to step S806.

In the case where transmission has ended, or when the spatial correlation is below the predetermined threshold value, the communication status is maintained.

The process of steps S805–S812 may be repeated during conversation, as necessary.

Figure 22:
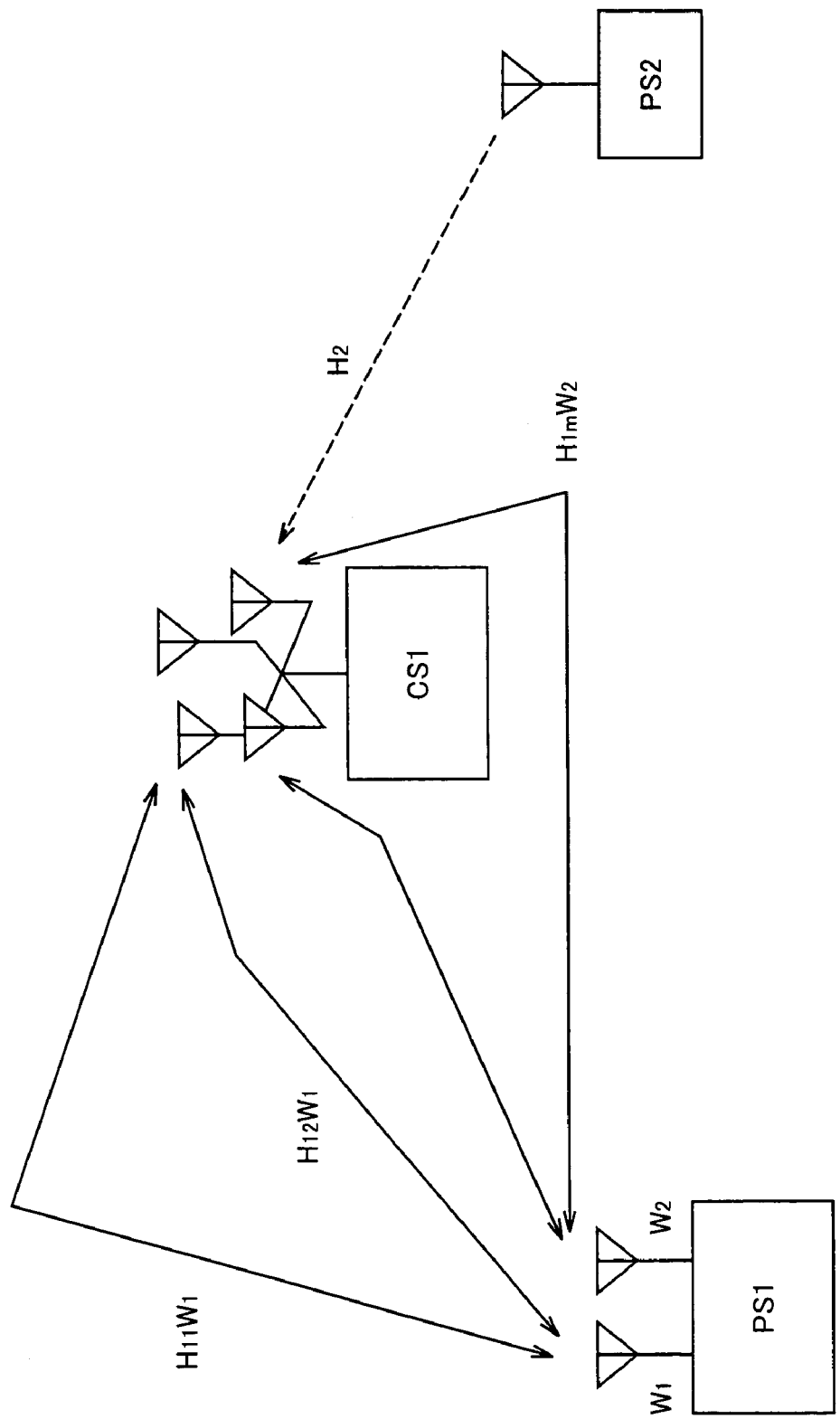
FIG. 22 is a schematic diagram showing a state where radio communication is effected between adaptive array base station CS1 and respective terminals of an adaptive array terminal PS1 and a terminal PS2 that carries out general non-directional transmission and reception.
Figure 23:
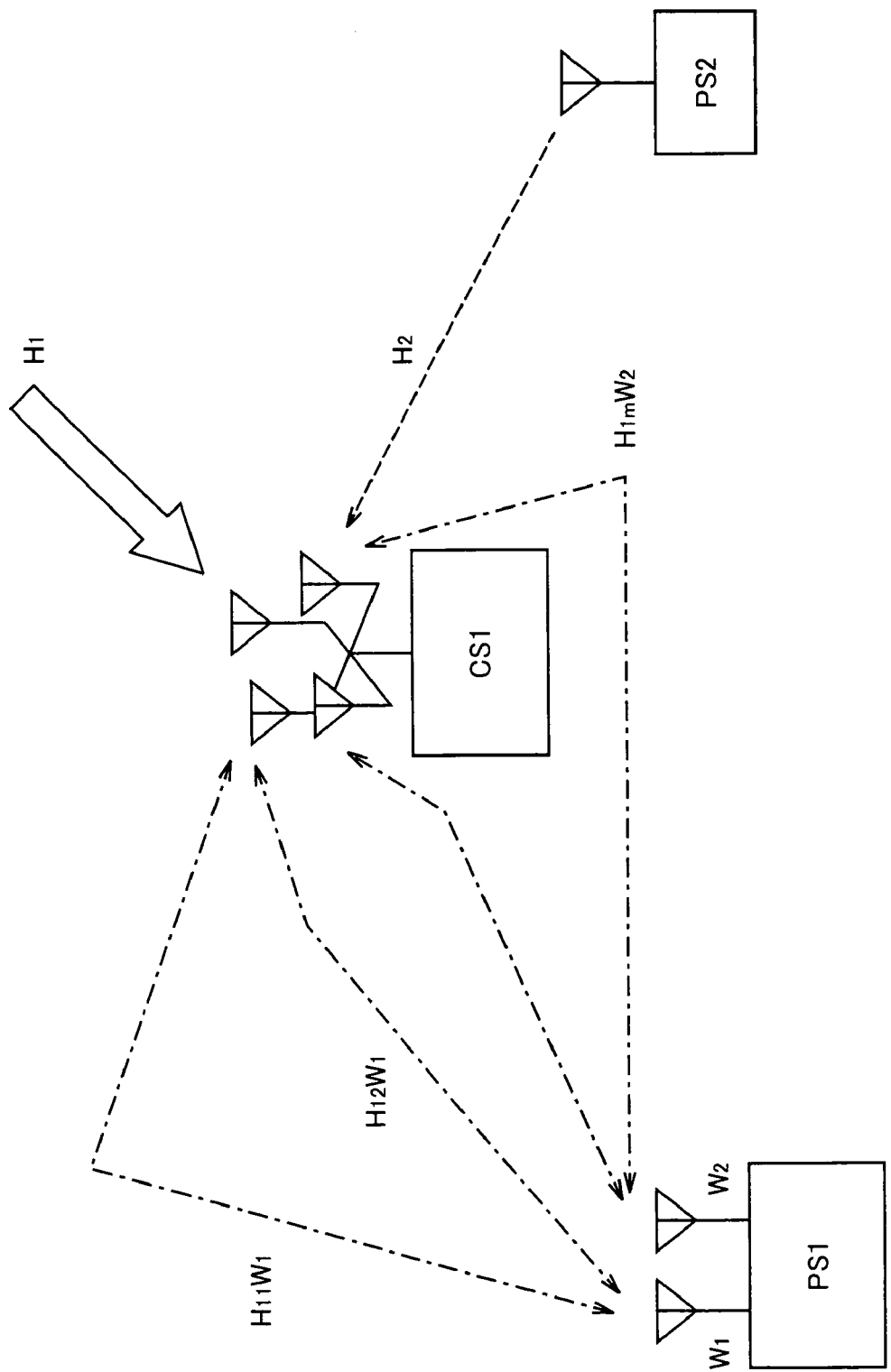
FIG. 23 shows a reception signal response vector $H_1$ as a composite vector with respect to signals propagated via a plurality of paths from adaptive array terminal PS1.

As described with reference to FIG. 22, the same plurality of signals arrive at SDMA base station 1002 from adaptive array terminal PS1 when signals are transmitted and received between adaptive array terminal PS1 and SDMA base station 1002. The reception signal X(t) at the SDMA base station is represented as follows.

$$X(t)=H_{11}W_1S_1(t)+\ldots+H_{1m}W_2S_1(t)+H_2S_2(t)$$

$$X(t)=H_1S_1(t)+H_2S_2(t)$$

$$H_1=H_{11}W_1+\ldots+H_{1m}W_2$$

Since the plurality of signals arriving from adaptive array terminal PS1 are the same signals, the arriving direction corresponds to a composite vector of a plurality of signals.

Figure 14:
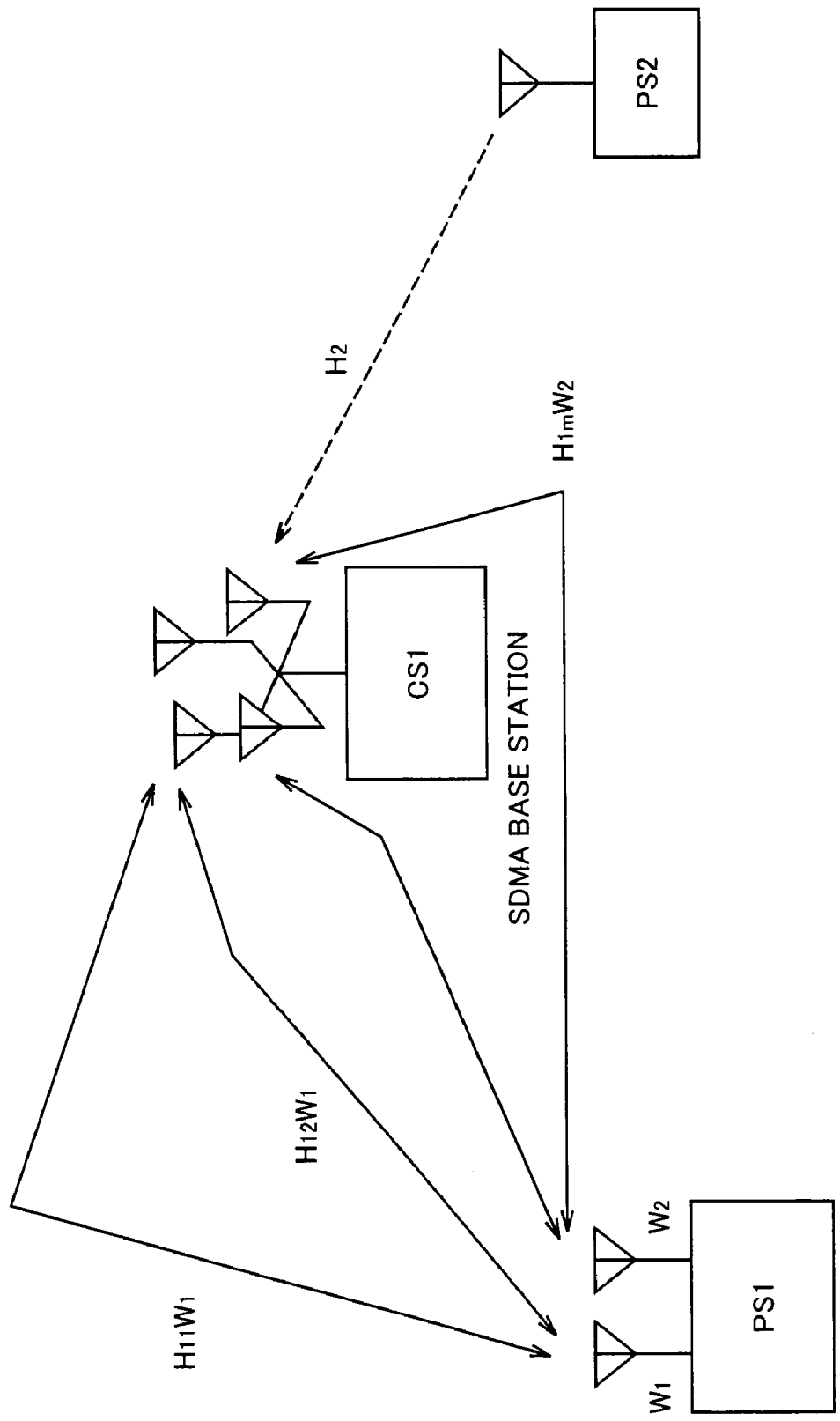
FIG. 14 is a schematic diagram showing a state of a plurality of arriving signals at an SDMA base station CS1.
Figure 15:
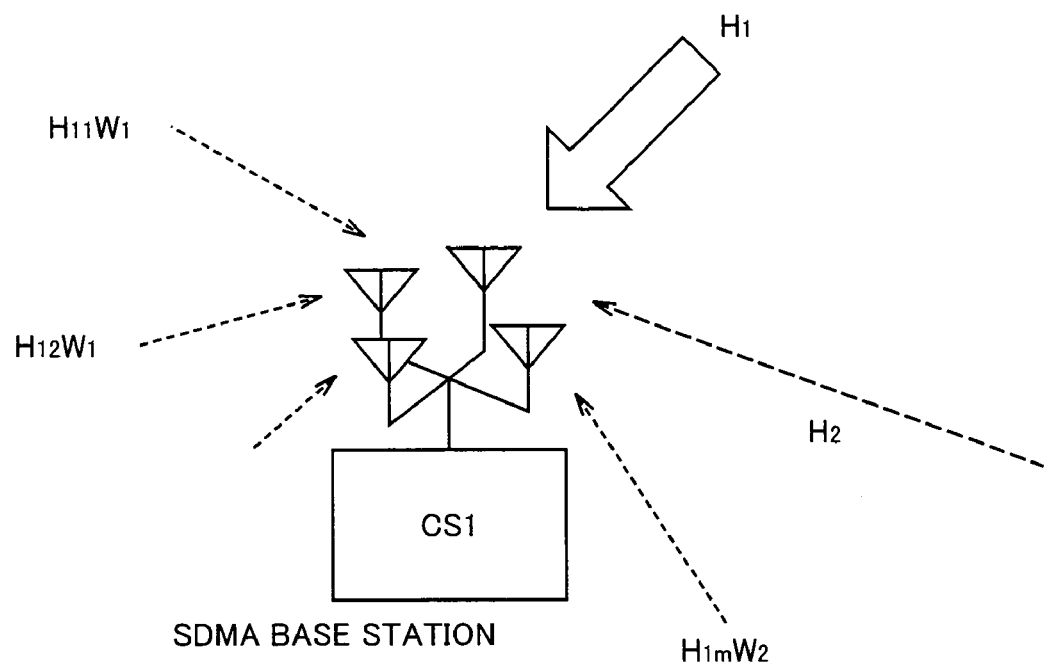
FIG. 15 is a schematic diagram to describe a reception response vector $H_1$ when a plurality of arriving signals are represented as a composite vector.

FIG. 14 is a schematic diagram showing the status where such plurality of arriving signals arrive at SDMA base station CS1. FIG. 15 is a schematic diagram to describe a reception response vector $H_1$ when such plurality of arriving signals are represented as a composite vector.

Figure 16:
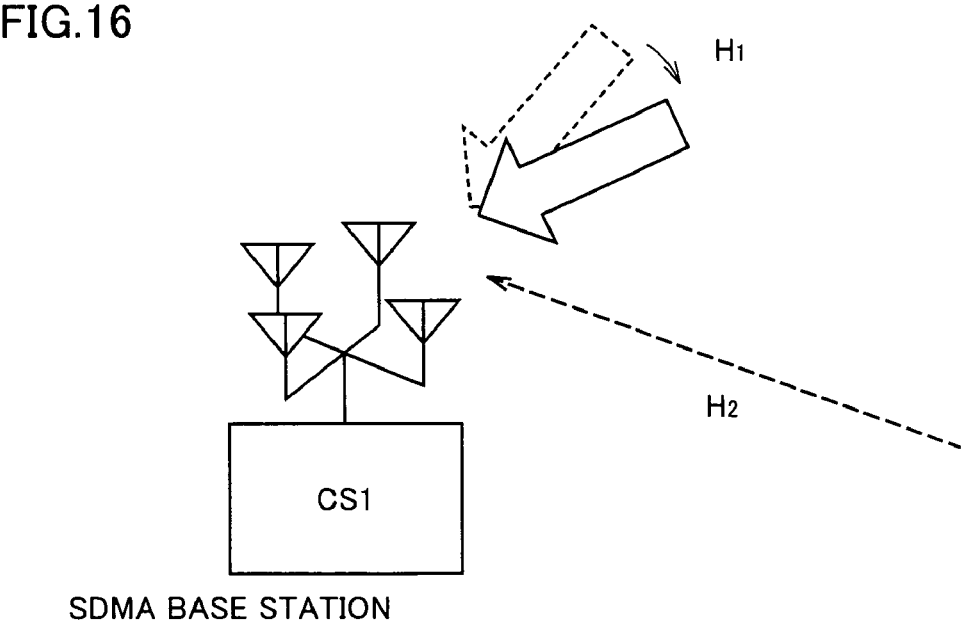
FIG. 16 is a schematic diagram to describe a reception response vector of a signal from adaptive array terminal PS1 over time.

FIG. 16 is a schematic diagram to describe change in the reception response vector of signals from adaptive array terminal PS1 over time.

When the correlation value between response vector $H_1$ of adaptive array terminal PS1 and response vector $H_2$ of terminal PS2 is increased, degradation in communication quality will occur. Therefore, base station CS1 designates terminal PS1 with the communication weight select capability to modify the transmission weight.

Figure 17:
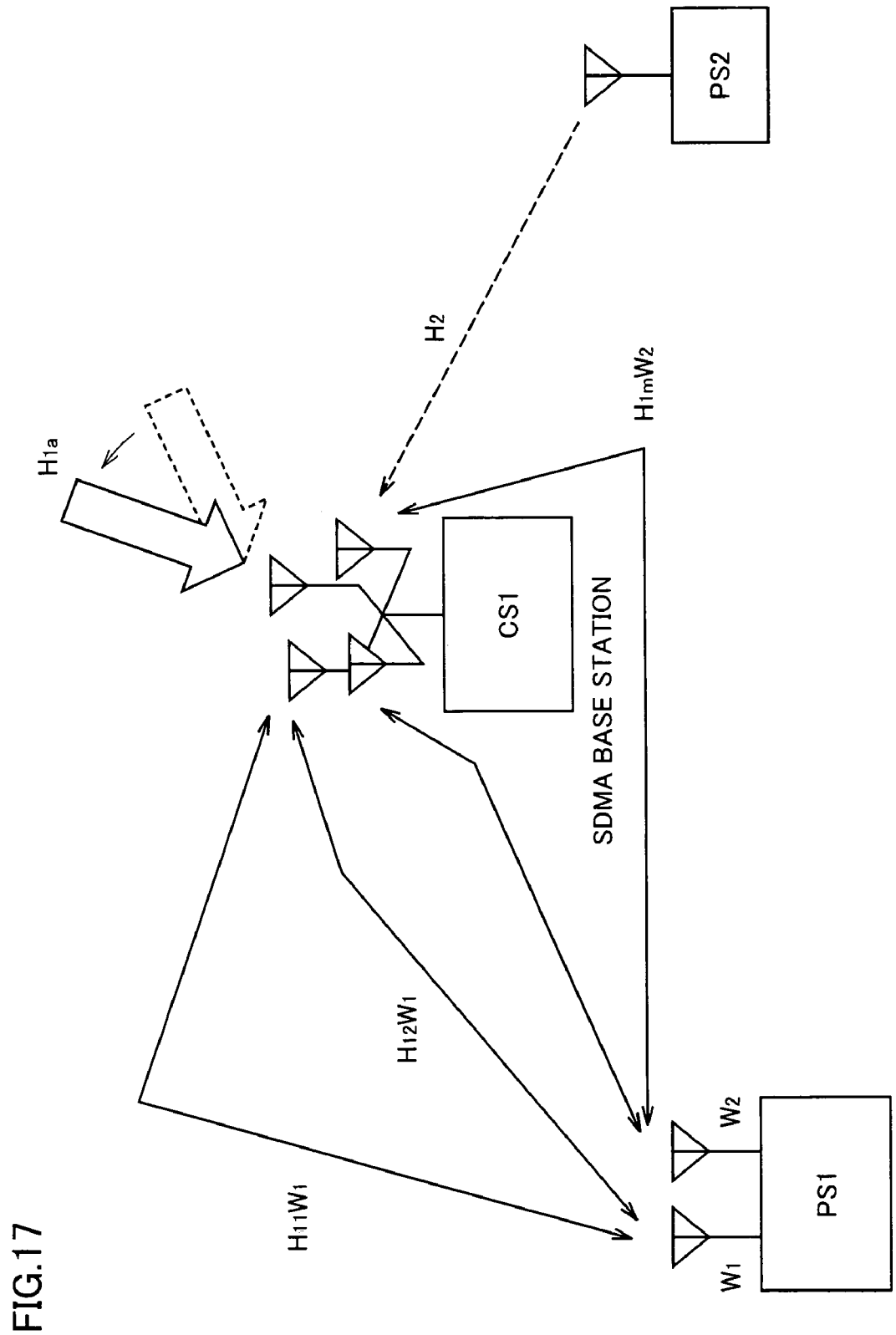
FIG. 17 is a schematic diagram to describe a reception response vector subsequent to designation of altering the transmission weight.
Figure 18:
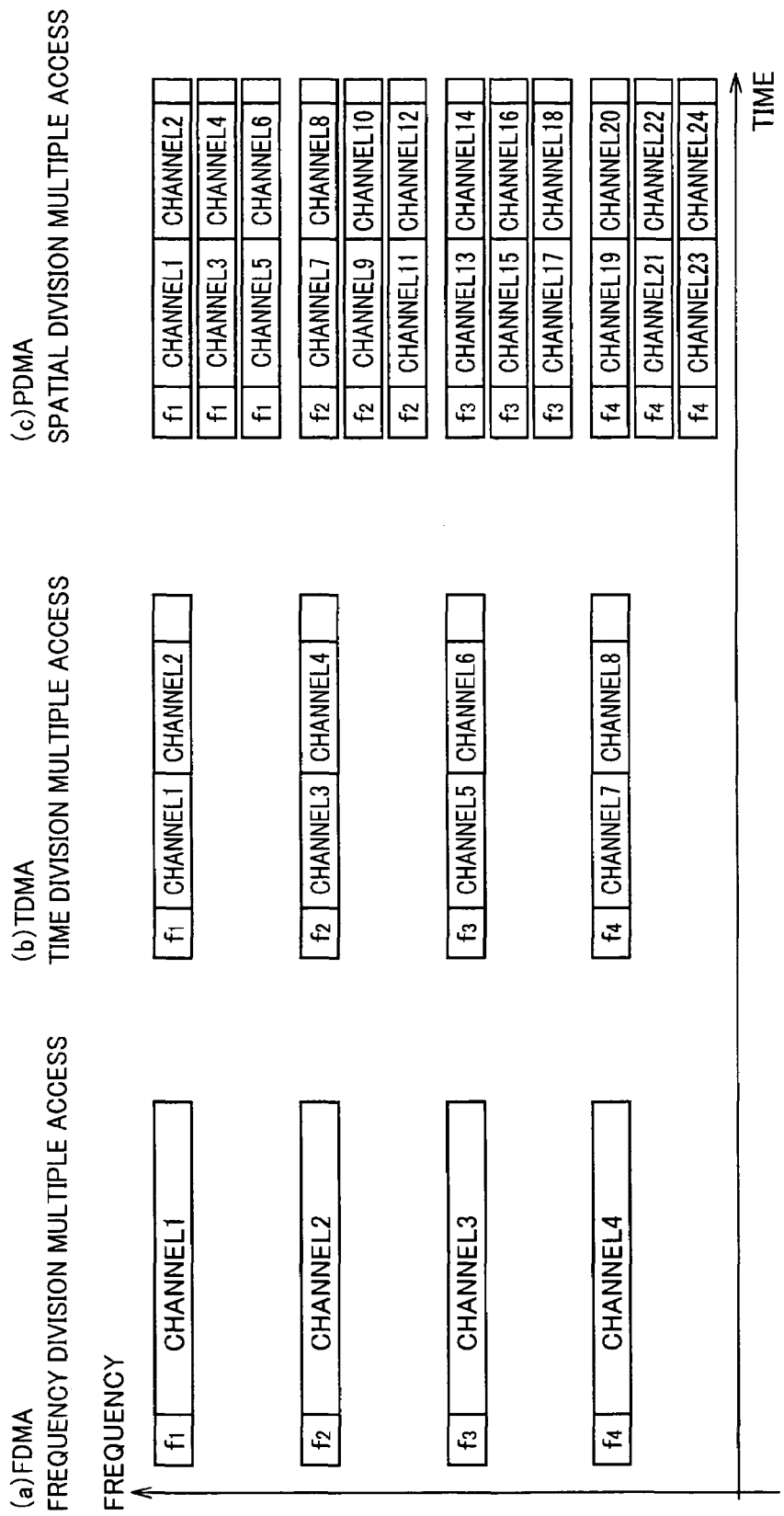
FIG. 18 shows channel arrangement in respective communication systems of frequency division multiple access, time division multiple access, and spatial division multiple access.
Figure 19:
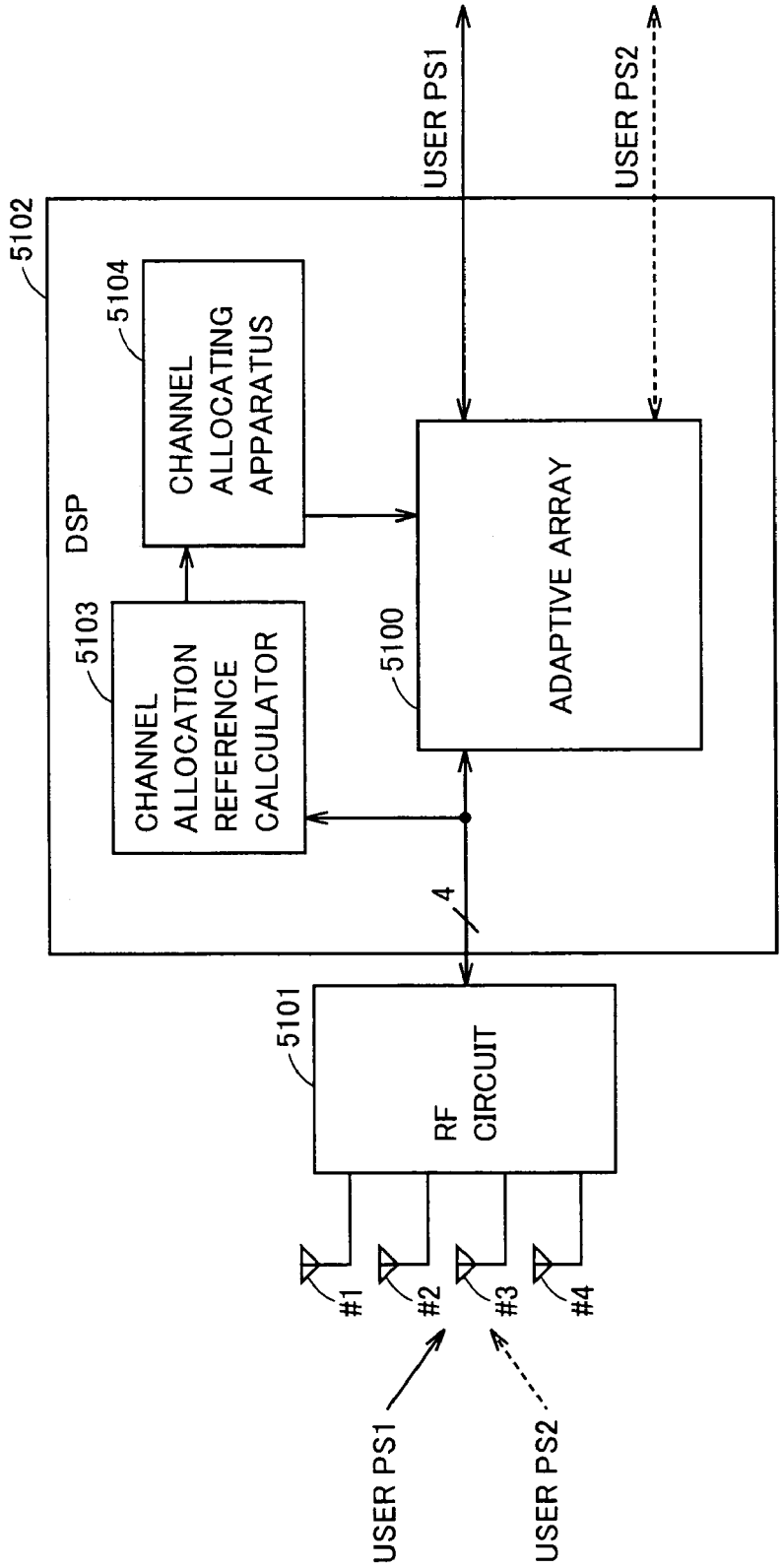
FIG. 19 is a schematic block diagram of a configuration of a transmission and reception system 5000 of a conventional SDMA base station.
Figure 20:
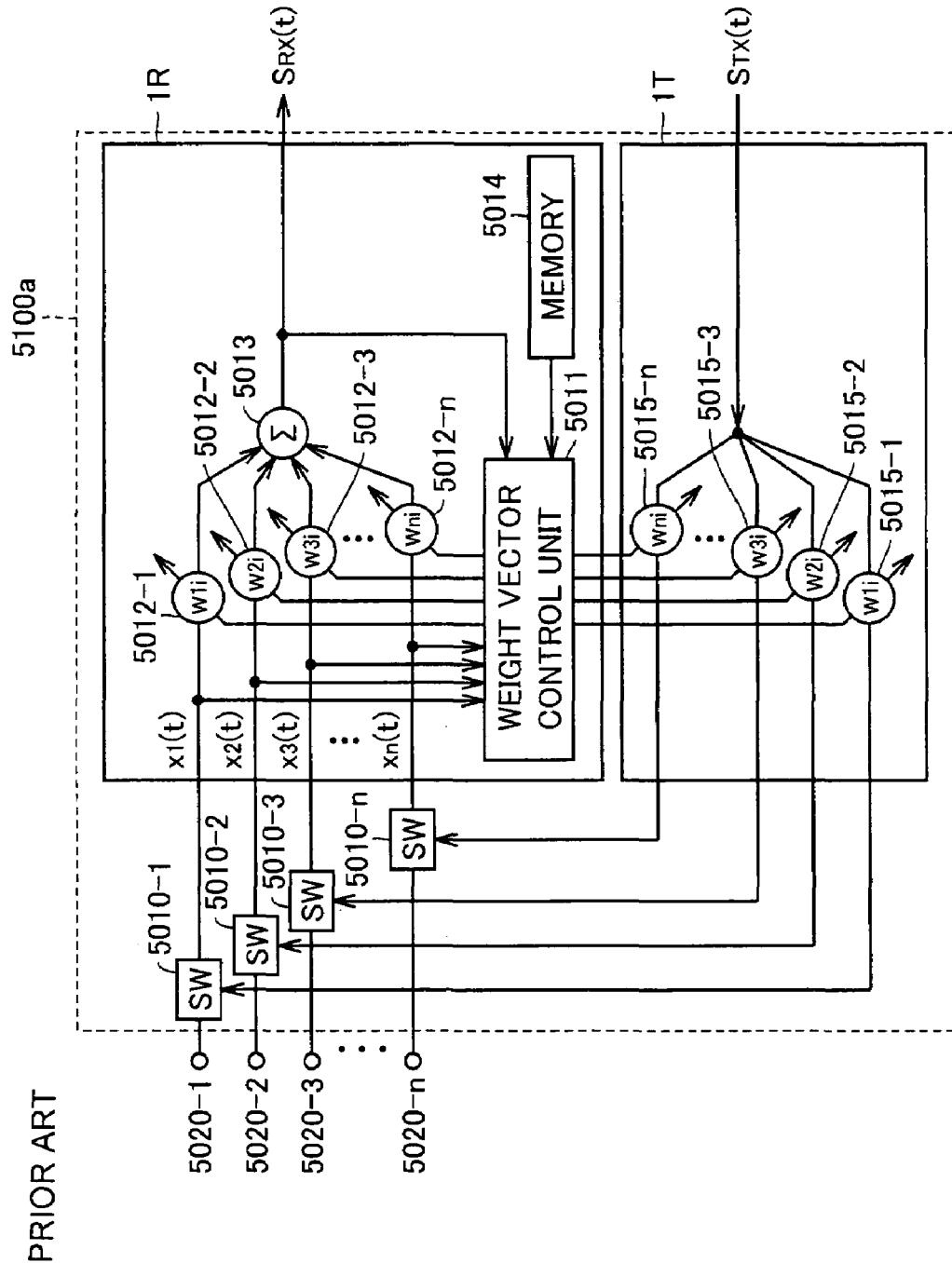
FIG. 20 is a block diagram of a configuration of a transmission and reception unit 5100a corresponding to one user in an adaptive array 5100.
Figure 21:
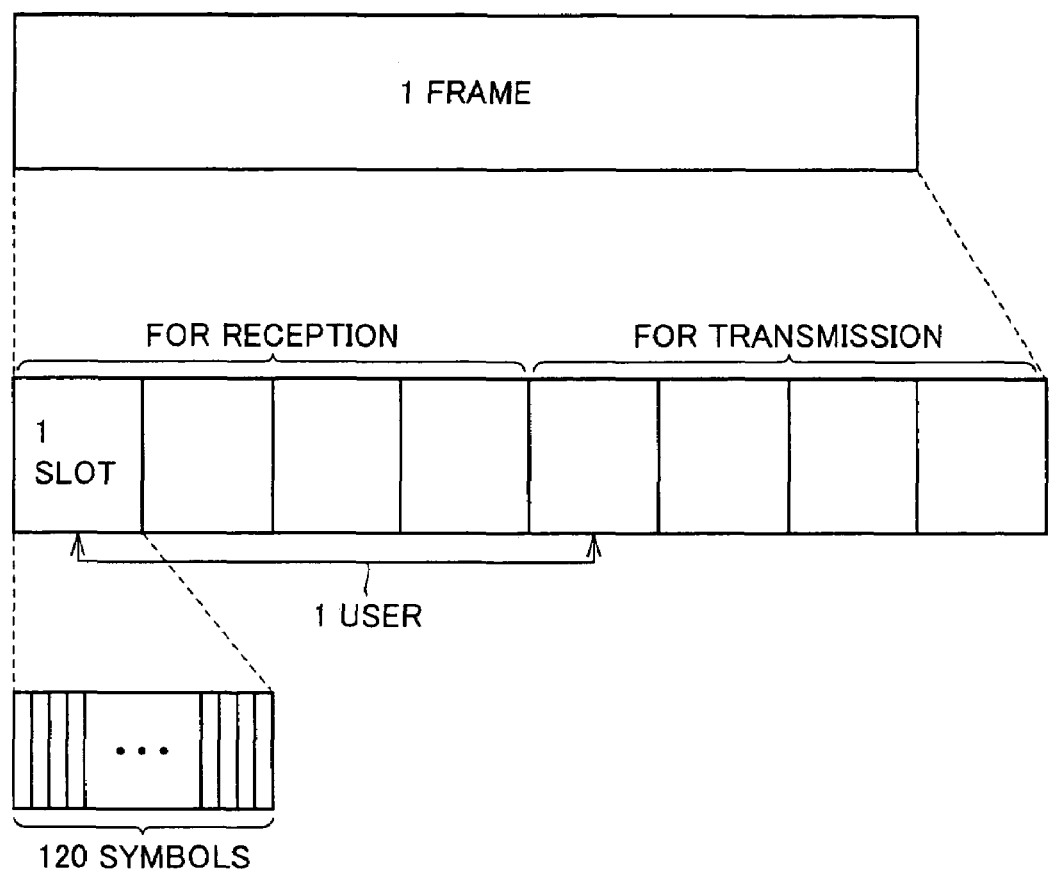
FIG. 21 is a schematic diagram to describe a configuration of a signal transferred between a terminal and an SDMA base station 5000.

FIG. 17 is a schematic diagram to describe a reception response vector following designation of transmission weight modification.

In comparison with the case of FIG. 16, the uplink signal can be readily separated by reducing the correlation value between reception response vector $H_{1a}$ corresponding to terminal PS1 and response vector $H_2$ of terminal PS2.

With regards to the transmission weight that is modified at terminal PS1 in response to designation, a plurality of transmission weights may be stored in a fixed manner in orthogonal transmission weight table 2222, in addition to the configuration of searching for and storing in the memory a weight of high orthogonality while conducting communication with the base station. Alternatively, a configuration in which weights of high orthogonality are set in ranks while conducting communication with base station CS1 can be employed.

The first and second embodiments set forth above are based mainly on calculation of a transmission weight.

In the calculation of a reception weight at the adaptive array terminal described in the first and second embodiments, the time required for calculating a reception weight can be reduced by dynamically modifying the setting of the initial value in accordance with modification of the transmission weight.

For example, when the reception weight is to be updated by the least mean square error algorithm (LMS algorithm) based on the steepest descent method, the time for convergence of the transmission weight can be reduced by taking the initial value of the reception weight as the transmission weight.

Alternatively, when the reception weight is to be modified by the recursive least square method (RLS algorithm), the time for convergence of the reception weight can be reduced by setting the initial value of the reception weight as the transmission weight, or by setting a value calculated from the response vector at the time of transmission for the initial value of the reception correlation matrix.

These LMS algorithm and RLS algorithm are disclosed in the aforementioned Document 1.

As described above, the invention of the present application allows improvement in communication quality as compared to a conventional adaptive array terminal by applying restriction so as to change the transmission weight gradually when in communication with a base station that communicates under the spatial multiple access system.

Furthermore, the communication quality can be improved when the transmission method is adaptively switched in an area where there is a mixture of base stations communicating under the spatial multiple access system and another system.

INDUSTRIAL APPLICABILITY

The invention of the present application is advantageous in that the communication quality can be improved by applying restriction so as to set the modification of the transmission weight to be altered gradually when an adaptive array terminal communicates with a base station of a spatial multiple access system.

The invention claimed is:
1. A radio terminal apparatus comprising:
an array antenna including a plurality of antennas (#ANT 1, #ANT 2),
a reception signal processing unit extracting a reception signal from a base station by multiplying signals from respective said antennas of said array antenna by respective reception weights,
a transmission signal processing unit applying to respective said antennas of said array antenna a plurality of signals generated by multiplying a transmission signal by transmission weights to form transmission directivity, and
transmission weight generation means for adaptively switching between a mode of calculating transmission weights forming transmission directivity towards said base station and a mode of calculating said transmission weights added with a specified constraint, in accordance with designation in said reception signal, to generate said transmission weights.

2. The radio terminal apparatus according to claim 1, wherein said transmission weight generation means provides, when said reception signal processing unit multiplies a signal from said base station by reception weights having reception directivity, said reception weights as said transmission weights to said transmission signal processing unit, in accordance with designation from said base station.

3. The radio terminal apparatus according to claim 1, wherein said transmission weight generation means generates, when said reception signal processing unit multiplies a signal from said base station by reception weights having reception directivity, said transmission weights based on a transmission response vector estimated from a reception response vector, in accordance with designation from said base station.

4. The radio terminal apparatus according to claim 1, wherein said transmission weight generation means sets said transmission weight with a fixed amplitude and phase when said reception signal processing unit multiplies a signal from said base station by reception weights having reception directivity, in accordance with designation from said base station.

5. The radio terminal apparatus according to claim 1, wherein said transmission weight generation means carries out a process of setting a fixed value of amplitude of said transmission weight, and gradually shifting a phase of said transmission weight according to a predetermined sequence when said reception signal processing unit multiplies a signal from said base station by reception weights having reception directivity, in accordance with designation from said base station.

6. The radio terminal apparatus according to claim 5, wherein
a signal transferred between said base station and said radio terminal apparatus is divided into a plurality of frames,
said transmission weight generation means calculates said phase of said transmission weight by a weighted mean of said reception weights in past and current frames.

7. The radio terminal apparatus according to claim 1, wherein
a signal transferred between said base station and said radio terminal apparatus is divided into a plurality of frames,
said transmission weight generation means calculates said transmission weight based on a weighted mean of reception response vectors in past and current frames when said reception signal processing unit multiplies a signal from said base station by reception weights having reception directivity, in accordance with designation from said base station.

8. The radio terminal apparatus according to claim 1, further comprising reception level detection means for detecting a reception level of each of said antennas,
wherein said transmission weight generation means generates said transmission weights so as to select an antenna of the highest reception level.

9. The radio terminal apparatus according to claim 1, wherein
a signal transferred between said base station and said radio terminal apparatus is divided into a plurality of frames,
said transmission weight generation means takes a weighted mean of transmission weights calculated in past and current frames newly as a transmission weight of the current frame when said reception signal processing unit multiplies a signal from said base station by a reception weight having reception directivity, in accordance with designation from said base station.

10. The radio terminal apparatus according to claim 1, further comprising storage means for storing in advance a set of transmission weights that increases orthogonality of reception response vectors at said base station,
wherein said transmission weight generation means selects and provides to said transmission signal processing unit said transmission weight stored in said storage means, in accordance with designation from said base station.

11. A transmission directivity control method of a radio terminal apparatus including an array antenna having a plurality of antennas (#ANT 1, #ANT 2) and for separating and extracting a reception signal from a base station by multiplying signals from respective said antennas of said array antenna by respective reception weights, said method comprising the steps of:
adaptively switching between a mode of calculating transmission weights forming transmission directivity towards said base station and a mode of calculating said transmission weights added with a specified constraint, in accordance with designation in said reception signal, to generate said transmission weights, and
providing to respective said antennas of said array antenna a plurality of signals generated by multiplying a transmission signal by said transmission weights to form said transmission directivity.

12. The transmission directivity control method according to claim 11, wherein said step of generating transmission weights includes the step of, when a signal from said base station is multiplied by reception weights having reception directivity, taking said reception weights as said transmission weights, in accordance with designation from said base station.

13. The transmission directivity control method according to claim 11, wherein said step of generating transmission weights includes the step of generating, when a signal from said base station is multiplied by reception weights having reception directivity, said transmission weights based on a transmission response vector estimated from a reception response vector, in accordance with designation from said base station.

14. The transmission directivity control method according to claim 11, wherein said step of generating transmission weights includes the step of setting said transmission weight with a fixed amplitude and phase when a signal from said base station is multiplied by reception weights having reception directivity, in accordance with designation from said base station.

15. The transmission directivity control method according to claim 11, wherein said step of generating transmission weights includes the step of, when said reception signal processing unit multiplies a signal from said base station by reception weights having reception directivity, carrying out a process of setting a fixed value of amplitude of said transmission weight, and gradually shifting a phase of said transmission weight according to a predetermined sequence, in accordance with designation from said base station.

16. The transmission directivity control method according to claim 11, wherein
a signal transferred between said base station and said radio terminal apparatus is divided into a plurality of frames,
said step of generating transmission weights includes the step of calculating a phase of said transmission weight based on a weighed mean of said reception weights in past and current frames.

17. The transmission directivity control method according to claim 11, wherein
a signal transferred between said base station and said radio terminal apparatus is divided into a plurality of frames,
said step of generating transmission weights includes the step of calculating said transmission weight based on a weighted mean of reception response vectors in past and current frames when a signal from said base station is multiplied by reception weights having reception directivity, in accordance with designation from said base station.

18. The transmission directivity control method according to claim 11, further comprising the step of detecting a reception level of each of said antennas,
wherein said step of generating transmission weights includes the step of generating said transmission weights so as to select an antenna of highest reception level.

19. The transmission directivity control method according to claim 11, wherein
a signal transferred between said base station and said radio terminal apparatus is divided into a plurality of frames,
said step of generating transmission weights includes the step of taking a weighted mean of transmission weights calculated in past and current frames newly as a transmission weight of the current frame when a signal from said base station is multiplied by reception weights having reception directivity, in accordance with designation from said base station.

20. The transmission directivity control method according to claim 11, further comprising the step of storing in advance a set of transmission weights that increases orthogonality of reception response vectors at said base station,
wherein said step of generating transmission weights includes the step of selecting said transmission weight stored in advance in accordance with designation from said base station.

21. A transmission directivity control program of a radio terminal apparatus including an array antenna having a plurality of antennas (#ANT 1, #ANT 2) and for separating and extracting a reception signal from a base station by multiplying signals from respective said antennas of said array antenna by respective reception weights, said program causing a computer to execute the steps of:
adaptively switching between a mode of calculating transmission weights forming transmission directivity towards said base station and a mode of calculating said transmission weights added with a specified constraint, in accordance with designation in said reception signal, to generate said transmission weights, and providing to respective said antennas of said array antenna a plurality of signals generated by multiplying a transmission signal by said transmission weights to form said transmission directivity.

22. The transmission directivity control program according to claim 21, wherein said step of generating transmission weights includes the step of, when a signal from said base station is multiplied by reception weights having reception directivity, taking said reception weights as said transmission weights, in accordance with designation from said base station.

23. The transmission directivity control program according to claim 21, wherein said step of generating transmission weights includes the step of generating, when a signal from said base station is multiplied by reception weights having reception directivity, said transmission weights based on a transmission response vector estimated from a reception response vector, in accordance with designation from said base station.

24. The transmission directivity control program according to claim 21, wherein said step of generating transmission weights includes the step of setting said transmission weight with a fixed amplitude and phase when a signal from said base station is multiplied by reception weights having reception directivity, in accordance with designation from said base station.

25. The transmission directivity control program according to claim 21, wherein said step of generating transmission weights includes the step of, when said reception signal processing unit multiplies a signal from said base station by reception weights having reception directivity, carrying out a process of setting a fixed value of amplitude of said transmission weight, and gradually shifting a phase of said transmission weight according to a predetermined sequence, in accordance with designation from said base station.

26. The transmission directivity control program according to claim 21, wherein a signal transferred between said base station and said radio terminal apparatus is divided into a plurality of frames, said step of generating transmission weights includes the step of calculating said phase of said transmission weight based on a weighed mean of said reception weights in past and current frames.

27. The transmission directivity control program according to claim 21, wherein a signal transferred between said base station and said radio terminal apparatus is divided into a plurality of frames, said step of generating transmission weights includes the step of calculating said transmission weight based on a weighted mean of reception response vectors in past and current frames, when a signal from said base station is multiplied by reception weights having reception directivity, in accordance with designation from said base station.

28. The transmission directivity control program according to claim 21, further comprising the step of detecting a reception level of each of said antennas, wherein said step of generating transmission weights includes the step of generating said transmission weights so as to select an antenna of highest reception level.

29. The transmission directivity control program according to claim 21, wherein a signal transferred between said base station and said radio terminal apparatus is divided into a plurality of frames, said step of generating transmission weights includes the step of taking a weighted mean of transmission weights calculated in past and current frames newly as a transmission weight of the current frame when a signal from said base station is multiplied by reception weights having reception directivity, in accordance with designation from said base station.

30. The transmission directivity control program according to claim 21, further comprising the step of storing in advance a set of transmission weights that increases orthogonality of reception response vectors at said base station, wherein said step of generating transmission weights includes the step of selecting said transmission weight stored in advance in accordance with designation from said base station.

* * * * *

UNITED STATES PATENT AND TRADEMARK OFFICE
CERTIFICATE OF CORRECTION

PATENT NO. : 7,071,874 B2
APPLICATION NO. : 10/508211
DATED : July 4, 2006
INVENTOR(S) : Yoshiharu Dioi It is certified that error appears in the above-identified patent and that said Letters Patent is hereby corrected as shown below:

Title page & Col. 1, Ln 1-3

Item "(54)", change "Device" to -- Apparatus --

Signed and Sealed this

Twenty-fourth Day of October, 2006

JON W. DUDAS
*Director of the United States Patent and Trademark Office*